(12) United States Patent
Park et al.

(10) Patent No.: US 12,549,968 B2
(45) Date of Patent: Feb. 10, 2026

(54) METHOD AND APPARATUS FOR CONFIGURING ARTIFICIAL NEURAL NETWORK FOR WIRELESS COMMUNICATION IN MOBILE COMMUNICATION SYSTEM

(71) Applicant: ELECTRONICS AND TELECOMMUNICATIONS RESEARCH INSTITUTE, Daejeon (KR)

(72) Inventors: Han Jun Park, Daejeon (KR); An Seok Lee, Daejeon (KR); Heesoo Lee, Daejeon (KR); Yong Jin Kwon, Daejeon (KR); Hyun Seo Park, Daejeon (KR); Yu Ro Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 351 days.

(21) Appl. No.: 18/308,188

(22) Filed: Apr. 27, 2023

(65) Prior Publication Data

US 2023/0354063 A1 Nov. 2, 2023

(30) Foreign Application Priority Data

Apr. 28, 2022 (KR) .......................... 10-2022-0053039
Apr. 26, 2023 (KR) .......................... 10-2023-0054647

(51) Int. Cl.
*H04W 8/24* (2009.01)
*G06N 3/08* (2023.01)
*H04W 24/02* (2009.01)

(52) U.S. Cl.
CPC .............. *H04W 24/02* (2013.01); *G06N 3/08* (2013.01)

(58) Field of Classification Search
CPC ....... H04W 24/02; H04W 24/08; H04W 8/24; H04W 24/10; H04W 12/03; H04W 88/06; H04W 4/70; H04W 8/22; H04W 28/06; H04W 88/02; H04W 72/231; H04W 72/23; H04W 16/14; H04W 12/106; H04W 80/02; H04W 88/08; H04W 48/18; G06N 3/08; G06N 3/0464; G06N 3/0455; G06N 3/09; G06N 3/088; G06N 20/00

See application file for complete search history.

(56) References Cited

U.S. PATENT DOCUMENTS

| | | | |
|---|---|---|---|
| 10,599,205 B2 | 3/2020 | He et al. | |
| 2018/0300621 A1* | 10/2018 | Shah | ................. G06N 3/0442 |
| 2020/0084777 A1* | 3/2020 | Ergen | ..................... H04L 41/16 |
| 2021/0110261 A1 | 4/2021 | Lee et al. | |
| 2021/0158151 A1* | 5/2021 | Wang | ...................... G06N 3/08 |
| 2021/0160149 A1* | 5/2021 | Ma | ........................ H04W 76/10 |
| 2022/0006543 A1 | 1/2022 | Jeon et al. | |
| 2022/0029665 A1 | 1/2022 | Hong et al. | |

(Continued)

*Primary Examiner* — Quan M Hua
(74) *Attorney, Agent, or Firm* — Rabin & Berdo, P.C.

(57) ABSTRACT

A method of a base station may comprise: receiving, from each of terminals belonging to the base station, a capability information report message related to an artificial neural network; generating artificial neural network configuration information based on capability of the base station and the capability information report message received from each of the terminals; and transmitting the generated artificial neural network configuration information to the terminals belonging to the base station.

17 Claims, 11 Drawing Sheets

(56) References Cited

U.S. PATENT DOCUMENTS

| | | | |
|---|---|---|---|
| 2022/0038349 A1* | 2/2022 | Li | G06N 3/045 |
| 2022/0101204 A1 | 3/2022 | Ly et al. | |
| 2022/0104213 A1 | 3/2022 | Song et al. | |
| 2022/0108214 A1* | 4/2022 | Lee | G06N 20/20 |
| 2022/0124836 A1 | 4/2022 | Tang | |
| 2022/0150727 A1 | 5/2022 | Pezeshki et al. | |
| 2023/0262478 A1* | 8/2023 | Hu | H04W 16/18 |
| | | | 370/254 |
| 2023/0397018 A1* | 12/2023 | Lee | H04W 74/0833 |

* cited by examiner

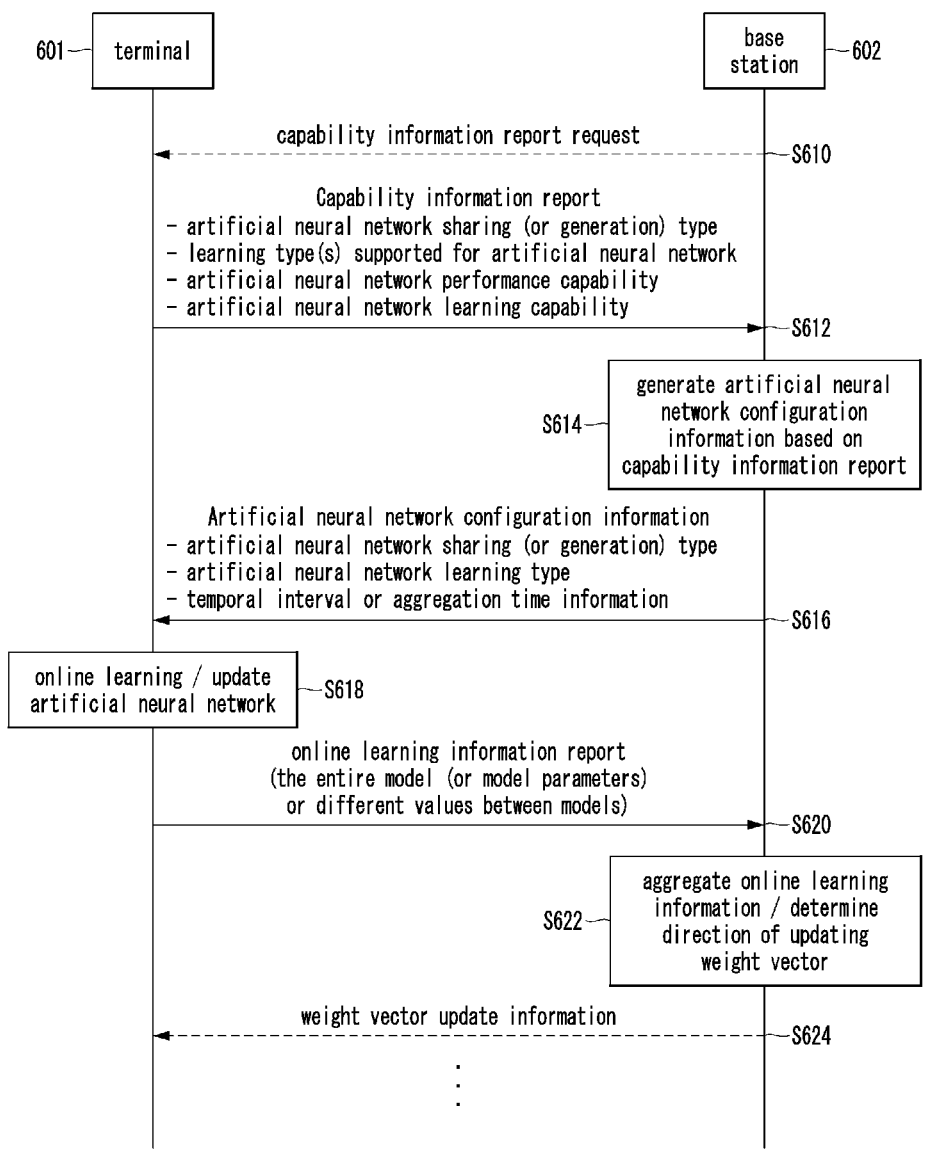

METHOD AND APPARATUS FOR CONFIGURING ARTIFICIAL NEURAL NETWORK FOR WIRELESS COMMUNICATION IN MOBILE COMMUNICATION SYSTEM

CROSS-REFERENCE TO RELATED APPLICATIONS

This application claims priority to Korean Patent Applications No. 10-2022-0053039, filed on Apr. 28, 2022, and No. 10-2023-0054647, filed on Apr. 26, 2023, with the Korean Intellectual Property Office (KIPO), the entire contents of which are hereby incorporated by reference.

BACKGROUND

1. Technical Field

Exemplary embodiments of the present disclosure relate to a technique for configuring an artificial neural network, and more specifically, to a technique for configuring an artificial neural network for wireless communication in a mobile communication system.

2. Related Art

The $3^{rd}$ generation partnership project (3GPP), an international standardization organization, has selected an Artificial Intelligence (AI)/Machine Learning (ML) application plan for new radio (NR) air interfaces as a future release 18 Study Item (SI). The purpose of the SI in release 18 is to establish use cases of utilizing AI/ML techniques for NR air interfaces, and to identify performance gains according to the AI/ML applications for each use case.

Specifically, in a mobile communication system, channel state information (CSI) feedback enhancement, beam management, positioning accuracy enhancement, and the like have been selected as representative use cases.

The CSI feedback may mean a process in which a terminal reports channel state information (CSI) in order to support a base station to apply a transmission technique or precoding such as multiple input multiple output (MIMO) in the mobile communication system. The 5G NR technical specifications defined by the 3GPP support feedback information such as a channel quality indicator (CQI), precoding matrix indicator (PMI), rank indicator (RI), and the like in connection with to the CSI feedback scheme. In the NR system, in order to effectively support a transmission technique such as multi-user MIMO (MU-MIMO), discussion on improving the CSI feedback techniques continues.

SUMMARY

An object of the present disclosure to solve the above-described needs is to classify configuration types and learning types of artificial neural networks existing in various manners in a mobile communication system composed of a base station and one or more terminals, so as to enable each of the base station and the terminals to easily perform management and implementation for the artificial neural networks.

A method of a base station, according to a first exemplary embodiment of the present disclosure, may comprise: receiving, from each of terminals belonging to the base station, a capability information report message related to an artificial neural network; generating artificial neural network configuration information based on capability of the base station and the capability information report message received from each of the terminals; and transmitting the generated artificial neural network configuration information to the terminals belonging to the base station, wherein the artificial neural network configuration information includes information indicating a type in which the artificial neural network is shared in units of a cell, a type in which the artificial neural network is shared in units of a terminal group, a type in which the artificial neural network is shared in units of a terminal, or a type in which the artificial neural network is shared in units of a cell group.

The capability information report message related to the artificial neural network may include information indicating one of the type in which the artificial neural network is shared in units of a cell, the type in which the artificial neural network is shared in units of a terminal group, the type in which the artificial neural network is shared in units of a terminal, or the type in which the artificial neural network is shared in units of a cell group, which each of the terminals supports.

When the artificial neural network configuration information indicates the type in which the artificial neural network is shared in units of a terminal group, the terminal group may include terminals having a same identification indicator.

When the artificial neural network configuration information indicates the type in which the artificial neural network is shared in units of a cell group, the cell group may include cells having a same identification indicator.

The artificial neural network configuration information may further include information indicating one of a type that does not support online learning, a type in which only the terminals support online learning, a type in which only the base station supports online learning, or a type in which both the base station and the terminals support online learning.

The artificial neural network configuration information may further include at least one of information on a temporal interval configured for each of the terminals to report information learned through the online learning or information on times for aggregating the information learned through the online learning from each of the terminals.

The method may further comprise: receiving an online learning information report message from the terminals based on the artificial neural network configuration information, wherein the online learning information report message may include an entire model of the artificial neural network after the online learning or a difference between the artificial neural network before the online learning and the artificial neural network after the online learning.

The method may further comprise: determining an update of a weight vector of the artificial neural network shared with the terminals based on the received online learning information report message; and transmitting weight update information to the terminals based on the determination to update the weight vector of the artificial neural network.

A method of a terminal, according to a second exemplary embodiment of the present disclosure, may comprise: receiving, from a base station of a cell to which the terminal belongs, a capability information report request message for an artificial neural network; transmitting a capability information report message related to the artificial neural network to the base station in response to reception of the capability information report request message; receiving artificial neural network configuration information from the base station; and configuring an artificial neural network in the terminal based on the received artificial neural network configuration information, wherein the artificial neural network configuration information includes information indicating a type in which the artificial neural network is shared in units of a cell, a type in which the artificial neural network is shared in units of a terminal group, a type in which the artificial neural network is shared in units of a terminal, or a type in which the artificial neural network is shared in units of a cell group.

The capability information report message related to the artificial neural network may include information indicating one of the type in which the artificial neural network is shared in units of a cell, the type in which the artificial neural network is shared in units of a terminal group, the type in which the artificial neural network is shared in units of a terminal, or the type in which the artificial neural network is shared in units of a cell group, which each of the terminals supports.

The artificial neural network configuration information may further include information indicating one of a type that does not support online learning, a type in which only the terminals support online learning, a type in which only the base station supports online learning, or a type in which both the base station and the terminals support online learning.

The artificial neural network configuration information may further include at least one of information on a temporal interval configured for each of the terminals to report information learned through the online learning or information on times for aggregating the information learned through the online learning from each of the terminals.

The method may further comprise: performing online learning of the artificial neural network configured in the terminal; generating an online learning information report message based on the online learning; and transmitting the online learning information report message to the base station based the information on the temporal interval configured to report the information learned through the online learning or information on times for aggregating the information learned through the online learning.

A base station according to a third exemplary embodiment of the present disclosure may comprise: a processor, and the processor may cause the base station perform: receiving, from each of terminals belonging to the base station, a capability information report message related to an artificial neural network; generating artificial neural network configuration information based on capability of the base station and the capability information report message received from each of the terminals; and transmitting the generated artificial neural network configuration information to the terminals belonging to the base station, wherein the artificial neural network configuration information includes information indicating a type in which the artificial neural network is shared in units of a cell, a type in which the artificial neural network is shared in units of a terminal group, a type in which the artificial neural network is shared in units of a terminal, or a type in which the artificial neural network is shared in units of a cell group.

The capability information report message related to the artificial neural network may include information indicating one of the type in which the artificial neural network is shared in units of a cell, the type in which the artificial neural network is shared in units of a terminal group, the type in which the artificial neural network is shared in units of a terminal, or the type in which the artificial neural network is shared in units of a cell group, which each of the terminals supports.

When the artificial neural network configuration information indicates the type in which the artificial neural network is shared in units of a terminal group, the terminal group may include terminals having a same identification indicator, and when the artificial neural network configuration information indicates the type in which the artificial neural network is shared in units of a cell group, the cell group may include cells having a same identification indicator.

The artificial neural network configuration information may further include information indicating one of a type that does not support online learning, a type in which only the terminals support online learning, a type in which only the base station supports online learning, or a type in which both the base station and the terminals support online learning.

The artificial neural network configuration information may further include at least one of information on a temporal interval configured for each of the terminals to report information learned through the online learning or information on times for aggregating the information learned through the online learning from each of the terminals.

The processor may further cause the base station to perform: receiving an online learning information report message from the terminals based on the artificial neural network configuration information, wherein the online learning information report message may include an entire model of the artificial neural network after the online learning or a difference between the artificial neural network before the online learning and the artificial neural network after the online learning.

The processor may further cause the base station to perform: determining an update of a weight vector of the artificial neural network shared with the terminals based on the received online learning information report message; and transmitting weight update information to the terminals based on the determination to update the weight vector of the artificial neural network.

According to exemplary embodiments of the present disclosure, an artificial neural network can be configured in each of the base station and the terminal, and communication using the artificial neural network can be performed more smoothly through such the configuration.

BRIEF DESCRIPTION OF DRAWINGS

FIG. 6 is a sequence diagram for a case of performing artificial neural network learning between a terminal and a base station according to the disclosure.

DETAILED DESCRIPTION OF THE EMBODIMENTS

Figure 1:
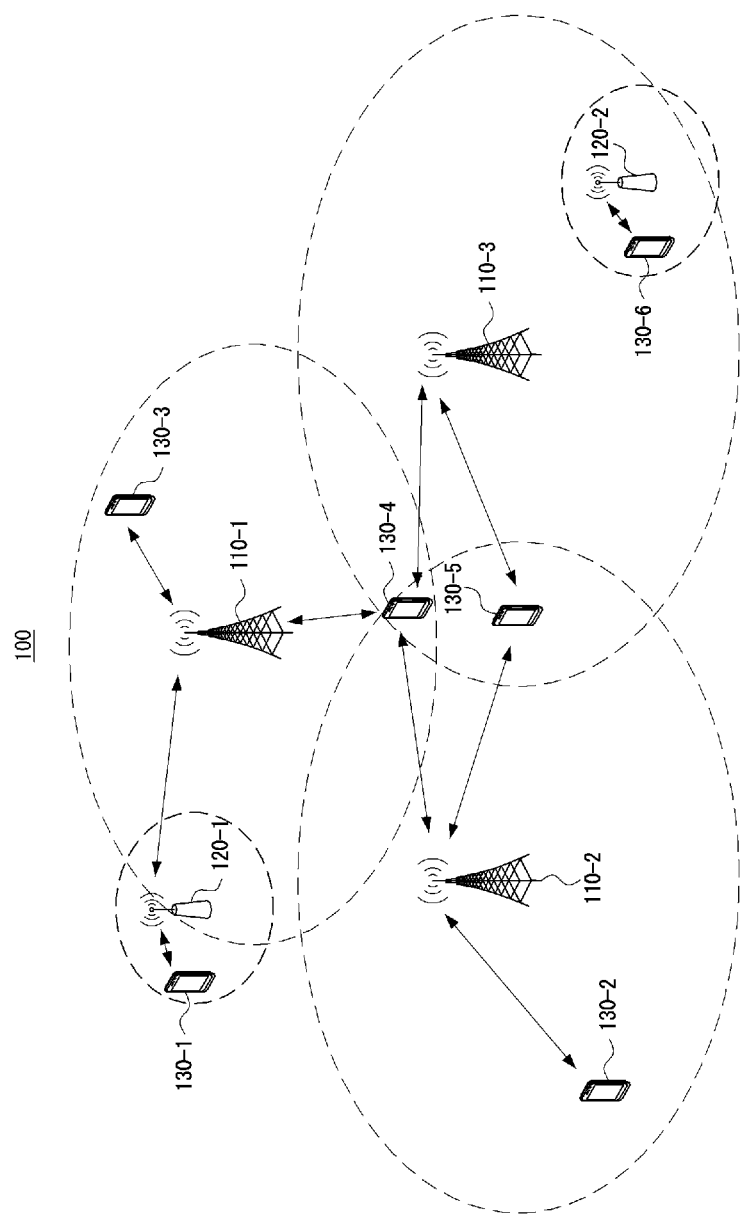
FIG. 1 is a conceptual diagram illustrating an exemplary exemplary embodiment of a communication system.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSDPA), 4G mobile communication network such as a long term evolution (LTE) network or an LTE-Advanced network, 5G mobile communication network, or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present specification, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating an exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4th generation (4G) communication (e.g., long term evolution (LTE), LTE-advanced (LTE-A)), 5th generation (5G) communication (e.g., new radio (NR)), or the like. The 4G communication may be performed in a frequency band of 6 gigahertz (GHz) or below, and the 5G communication may be performed in a frequency band of 6 GHz or above as well as the frequency band of 6 GHz or below.

For example, for the 4G and 5G communications, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

In addition, the communication system 100 may further include a core network. When the communication system 100 supports the 4G communication, the core network may comprise a serving gateway (S-GW), a packet data network (PDN) gateway (P-GW), a mobility management entity (MME), and the like. When the communication system 100 supports the 5G communication, the core network may comprise a user plane function (UPF), a session management function (SMF), an access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
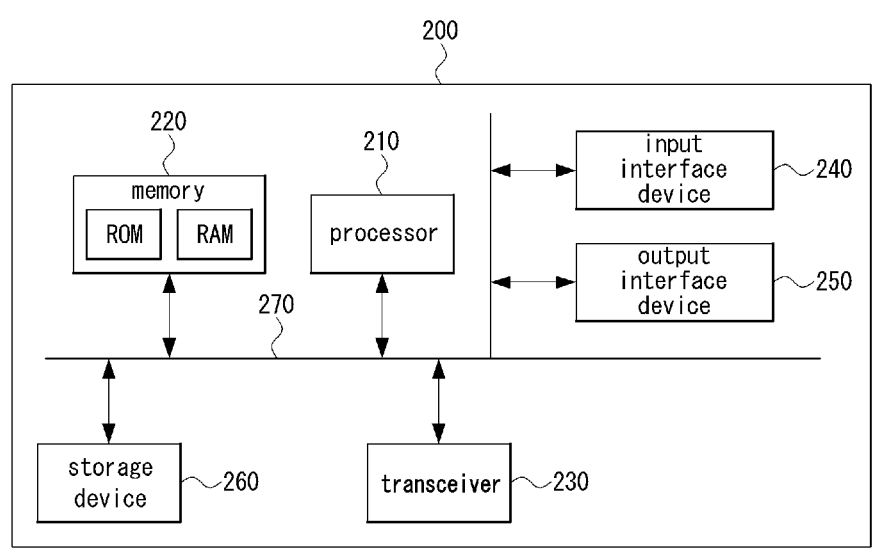
FIG. 2 is a block diagram illustrating an exemplary embodiment of a communication node constituting a communication system.

FIG. 2 is a block diagram illustrating an exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, a road side unit (RSU), a radio remote head (RRH), a transmission point (TP), a transmission and reception point (TRP), an eNB, a gNB, or the like.

Here, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, an Internet of things (IoT) device, a mounted apparatus (e.g., a mounted module/device/terminal or an on-board device/terminal, etc.), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support multi-input multi-output (MIMO) transmission (e.g., a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations

110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, methods and apparatuses for configuring artificial neural networks will be described. Even when a method (e.g., transmission or reception of a data packet) performed at a first communication node among communication nodes is described, the corresponding second communication node may perform a method (e.g., reception or transmission of the data packet) corresponding to the method performed at the first communication node. That is, when an operation of a terminal is described, a corresponding base station may perform an operation corresponding to the operation of the terminal. Conversely, when an operation of a base station is described, a corresponding terminal may perform an operation corresponding to the operation of the base station.

Meanwhile, in a communication system, a base station may perform all functions (e.g., remote radio transmission/reception function, baseband processing function, and the like) of a communication protocol. Alternatively, the remote radio transmission/reception function among all the functions of the communication protocol may be performed by a transmission reception point (TRP) (e.g., flexible (f)-TRP), and the baseband processing function among all the functions of the communication protocol may be performed by a baseband unit (BBU) block. The TRP may be a remote radio head (RRH), radio unit (RU), transmission point (TP), or the like. The BBU block may include at least one BBU or at least one digital unit (DU). The BBU block may be referred to as a 'BBU pool', 'centralized BBU', or the like. The TRP may be connected to the BBU block through a wired fronthaul link or a wireless fronthaul link. The communication system composed of backhaul links and fronthaul links may be as follows. When a functional split scheme of the communication protocol is applied, the TRP may selectively perform some functions of the BBU or some functions of medium access control (MAC)/radio link control (RLC) layers.

As described above, the CSI feedback enhancement, beam management, and positioning accuracy enhancement were selected as representative use cases in the mobile communication system.

Among these use cases, the CSI feedback means a process in which a terminal reports CSI in order to support a base station to apply a transmission technique or precoding such as MIMO in the mobile communication system. The 5G NR technical specifications defined by the 3GPP support feedback information such as a channel quality indicator (CQI), precoding matrix indicator (PMI), rank indicator (RI), and the like in connection with to the CSI feedback scheme. In the NR system, in order to effectively support a transmission technique such as multi-user MIMO (MU-MIMO), discussion on improving the CSI feedback techniques continues.

Specifically, the 3GPP NR system supports two types of codebooks to convey PMI information, which are respectively named a Type 1 codebook and a Type codebook. The Type 1 codebook has a structure in which a beam group is represented by oversampled discrete Fourier transform (DFT) matrixes, and one beam selected from the beam group is transmitted. On the other hand, the Type 2 codebook has a structure in which a plurality of beams are selected and information is transmitted in form of a linear combination of the selected beams. The Type 2 codebook has been evaluated as having a structure more suitable for supporting transmission techniques such as MU-MIMO compared to the Type 1 codebook, but has a disadvantage in that a CSI feedback load greatly increases according to its complex codebook structure. In relation to the above-described problem, a study on a method of obtaining a compressed latent expression for a MIMO channel using an auto-encoder, which is one of recent deep learning techniques, is being conducted.

The beam management means a process in which the base station and the terminal allocate transmission beam and/or reception beam resources, respectively, in the mobile communication system, and transmission beam and/or reception beam resource allocation may be applied when transmitting and receiving an analog beam using a spatial filter. In the 5G NR technical specifications defined by the 3GPP, reference signals such as synchronization signal block (SSB) and/or CSI-reference signal (CSI-RS) may be transmitted in a plurality of analog beam directions, such that the base station and/or terminal can search for an optimal beam.

However, the scheme in which the terminal searches for all of a plurality of analog beam directions and reports the optimal beam direction to the base station each time may have limitations in that a time delay and a signal transmission load may be caused. In relation to the above-described problem, researches are currently being conducted to predict information for a next beam by utilizing reinforcement learning, one of techniques in the field of AWL, or to infer high-resolution beam information from low-resolution beam information using a supervised learning scheme.

The positioning means a technique for measuring a position of a specific terminal in the mobile communication system. The 5G NR technical specifications defined by the 3GPP support a positioning scheme using an observed time difference of arrival (OTDOA) obtained by transmitting a positioning reference signal (PRS) to allow the terminal to report a reference signal time difference (RSTD). Recently, requirements for positioning accuracy are increasing, and research on improving the accuracy of measurement values for positioning by applying AI/ML techniques is being conducted from the perspective described above.

However, although AI/ML application technologies have been mainly discussed in terms of a link between a base station and a single terminal until now, there was no discussion on how to configure and train artificial neural network models for wireless communication when a plurality of terminals coexist within a cell managed by the base station.

Therefore, the present disclosure described below proposes a method of configuring and training an artificial neural network model for wireless communication in a mobile communication system composed of a base station and one or more terminals.

Specifically, in the present disclosure described below, in a mobile communication system composed of a base station and one or more terminals, types of artificial neural networks may be defined according to a type for sharing (or generating) an artificial neural network and/or a type of training an artificial neural network. In addition, the present disclosure described below provides a method for including type information of an artificial neural network when delivering configuration information or capability information of an artificial neural network between the base station and the terminal. In addition, the present disclosure described below provides a method for allowing the base station and the terminal to recognize a sharing (or generation) type and a learning type of the artificial neural network through the type information.

In the following description, for convenience of description, artificial neural network configuration and training methods proposed in the present disclosure will be mainly described in terms of downlink of the mobile communication system composed of the base station and the terminal. However, the methods proposed in the present disclosure may be extended and applied to an arbitrary wireless communication system composed of a transmitter and a receiver.

First Exemplary Embodiment

According to a first exemplary embodiment of the present disclosure, when applying an artificial neural network for wireless communication in a mobile communication system composed of a base station and one or more terminals, one or more types among sharing (or generation) types below may be defined for the artificial neural network according to a scheme in which the artificial neural network is shared (or generated).
 (1) Type 0: A type in which the artificial neural networks is shared (or generated) in units of a cell
 (2) Type 1: A type in which the artificial neural network is shared (or generated) in units of a terminal group
 (3) Type 2: A type in which the artificial neural network is shared (or generated) in units of a terminal
 (4) Type 3: A type in which the artificial neural network is shared (or generated) in units of a cell group In the first exemplary embodiment of the present disclosure, when the base station configures an artificial neural network for the terminal, a method of configuring sharing (or generation) type information for the artificial neural network is proposed.

In configuring the sharing (or generation) type information for the artificial neural network, according to the first exemplary embodiment of the present disclosure, a terminal group may be defined as a group of terminals having the same identification indicator (e.g., terminals the same group identifier or terminals having the same transmission characteristics).

In addition, in configuring sharing (or generation) type information for the artificial neural network according to the first exemplary embodiment of the present disclosure, a cell group may be defined as a group of cells having the same identification indicator.

In addition, in configuring sharing (or generation) type information for the artificial neural network, according to the first exemplary embodiment of the present disclosure, 'sharing (or generation) of the artificial neural network' may mean that the same structure and/or model parameters (or, weight vector) of the artificial neural network are applied for each application unit (i.e., cell, terminal group, terminal, or cell group).

In the present disclosure, for convenience of description, the artificial neural network according to the first exemplary embodiment of the present disclosure will be described assuming a mobile communication system, for example, the 5G NR system according to the 3GPP technical specifications. However, it should be noted that the assumption of the 5G NR system is only for convenience of understanding, and the exemplary embodiments of the present disclosure may be applied to all wireless communication systems each including a transmitting node and two or more receiving nodes.

In addition, as a target to which the artificial neural network according to the first exemplary embodiment of the present disclosure is applied, an example of encoding and/or decoding CSI between a base station and a terminal, which is described in the 3GPP technical specifications, will be described below. The CSI encoding/decoding described in the first exemplary embodiment of the present disclosure is merely an example, and the present disclosure is not limited thereto.

Hereinafter, a case in which an artificial neural network for encoding/decoding CSI between the base station and the terminal (hereinafter referred to as 'artificial neural network for CSI feedback') is applied to the 5G NR system according to the 3GPP technical specifications will be assumed and described.

When a plurality of terminals within a cell desire to use the same code for the same CSI as in the codebook-based CSI feedback scheme defined in the current technical specifications, preferable schemes will be described as follows.

First, it may be preferable to define an artificial neural network for CSI feedback in units of a cell. In other words, all terminals within a cell may perform CSI encoding/decoding by applying the same artificial neural network structure and weight vector.

Second, it may be determined that it is more effective for the base station to configure an artificial neural network for CSI feedback differently for each specific beam direction according to a channel environment. In this case, it may be preferable to define the artificial neural network for CSI feedback in units of a terminal group or in units of a terminal. A specific example thereon will be described.

In an NR system according to an exemplary embodiment of the present disclosure, terminals having the same transmission configuration indicator (TCI) in physical downlink shared channel (PDSCH) configuration information may be regarded as one terminal group. As described above, terminals having the same TCI may be configured as one terminal group, and the terminal group may perform CSI encoding/decoding by applying the same artificial neural network structure and weight vector. In an example of an artificial neural network sharing (or generation) type for CSI feedback, when an artificial neural network is shared (or generated) for a terminal group or a terminal, the base station may need to manage a plurality of different artificial neural networks, and thus, which sharing (or generation) type is to be applied may be configured according to capability of the base station.

The forms described above will be further described with reference to the accompanying drawings.

Figure 3A:
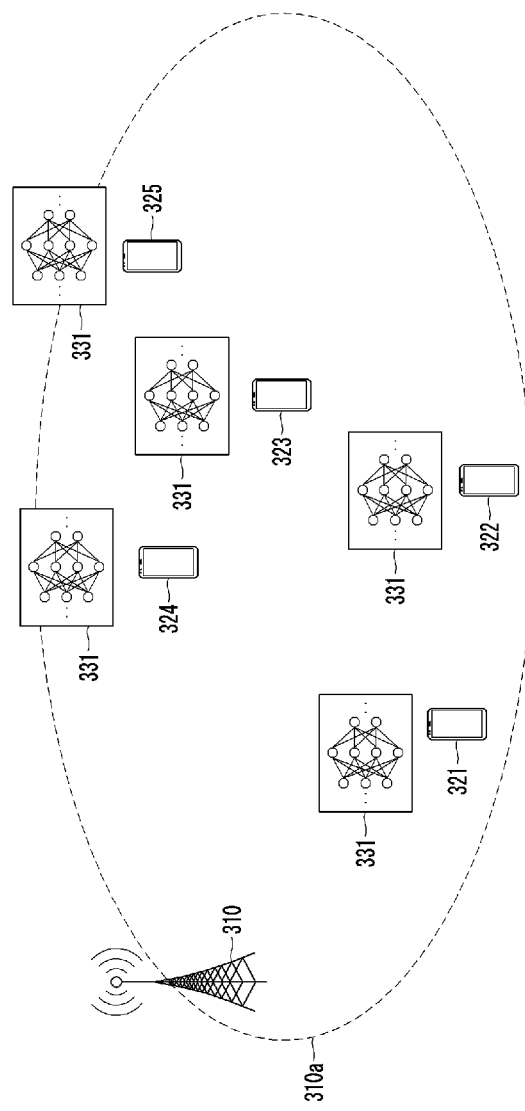
FIG. 3A is a conceptual diagram illustrating artificial neural network sharing (or generation) according to Type 0 of the first exemplary embodiment of the present disclosure.

FIG. 3A is a conceptual diagram illustrating artificial neural network sharing (or generation) according to Type 0 of the first exemplary embodiment of the present disclosure.

Referring to FIG. 3A, a base station 310 may correspond to a transmitting node and may have a communication coverage 310a based on a signal transmission distance. The base station 310 may communicate based on a communication scheme based on the 3GPP NR technical specifications, communicate based on 6G communication technical specifications to be supported in the future, and/or communicate based on other wireless communication scheme(s). In FIG. 3A, it may be assumed that the communication coverage 310a of the base station 310 corresponds to one cell. In the following description, the communication coverage 310a of the base station 310 will be described as being assumed as one cell.

Each of terminals 321, 322, 323, 324, and 325 located within the communication coverage of the base station 310 may correspond to a receiving node. All of the plurality of terminals 321 to 325 may be terminals capable of applying an artificial neural network according to the present disclosure. In addition, FIG. 3A is a conceptual diagram for describing a case of sharing an artificial neural network in units of a cell (i.e., Type 0). Since the terminals 321 to 325 illustrated in FIG. 3A are all located within the communication coverage 310a of the base station 310, they may share the same artificial neural network 331. Accordingly, in FIG. 3A, the same artificial neural network 331 is exemplified at the upper side of the terminals 321 to 325. The example of FIG. 3A is only for understanding, and in fact, each artificial neural network 331 may be stored in a memory (not shown in FIG. 3A) inside each of the terminals 321 to 325 and driven based on a processor or the like.

In addition, although an artificial neural network within the base station 310 is not illustrated in the example of FIG. 3A, the base station 310 may use the same artificial neural network 331 as those of the terminals 321 to 325. In other words, the base station 310 may be in a state of storing the same artificial neural network 331 as those of the terminals 321 to 325 within the communication coverage 310a in an internal memory (not shown in FIG. 3A). The artificial neural network 331 stored in the base station 310 may be driven by a processor or the like, and may be used when communicating with the terminals 321 to 325. Here, the communication may mean transmission and/or reception of radio frequency (RF) signals.

The artificial neural network 331 illustrated in FIG. 3A may be the artificial neural network for CSI feedback described above. As another example, the artificial neural network 331 illustrated in FIG. 3A may be an artificial neural network related to beam management, which is currently being discussed in the 3GPP. As another example, the artificial neural network 331 illustrated in FIG. 3A may be an artificial neural network for positioning accuracy enhancement, which is currently being discussed in the 3GPP. In addition, the artificial neural network 331 illustrated in FIG. 3A may be one of artificial neural networks based on various schemes to which the AI/ML is applied other than the schemes currently being discussed in the 3GPP.

Although the present disclosure described above has described the base station 310 and the terminals 321 to 325 in the communication system based on the 3GPP NR technical specification, they may be understood as a transmitting node and receiving nodes in other wireless communication systems. When there is one receiving node in another wireless communication system, it may correspond to a case that only one specific terminal is included in the example of FIG. 3A. In addition, in FIG. 3A, only five terminals have been exemplified and described, but those skilled in the art may know that more terminals may belong to the base station 310.

Figure 3B:
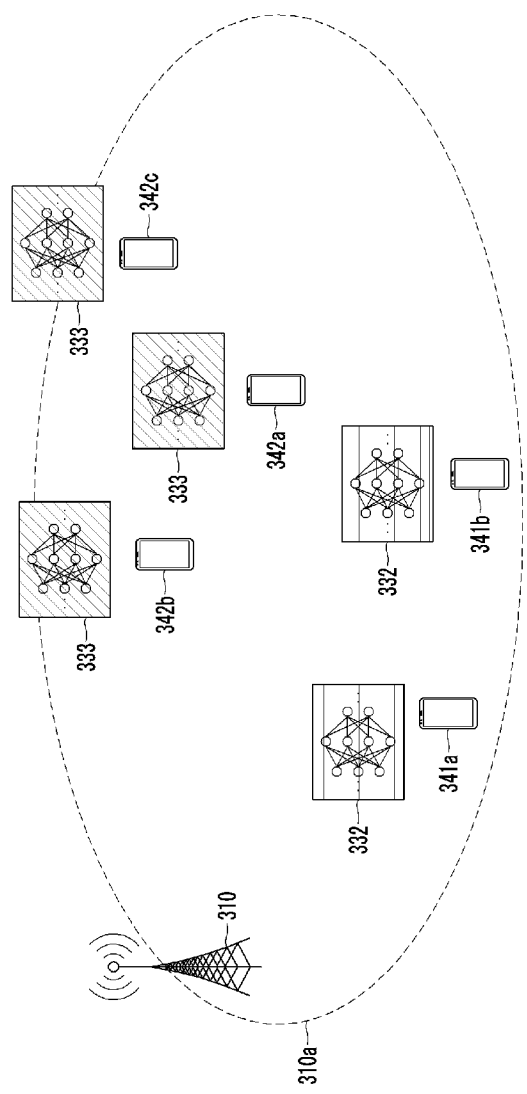
FIG. 3B is a conceptual diagram illustrating artificial neural network sharing (or generation) according to Type 1 of the first exemplary embodiment of the present disclosure.

FIG. 3B is a conceptual diagram illustrating artificial neural network sharing (or generation) according to Type 1 of the first exemplary embodiment of the present disclosure.

Referring to FIG. 3B, the base station 310 may correspond to a transmitting node and may have the communication coverage 310a based on a signal transmission distance. The base station 310 may communicate based on the communication scheme based on the 3GPP NR technical specifications, communicate based on 6G communication technical specifications to be supported in the future, and/or communicate based on other wireless communication scheme(s). In FIG. 3B, it may be assumed that the communication coverage 310a of the base station 310 corresponds to one cell. In the following description, the communication coverage 310a of the base station 310 will be described as being assumed as one cell Each of terminals 341a, 341b, 342a, 342b, and 342c located within the communication coverage of the base station 310 may correspond to a receiving node. All of the plurality of terminals 341a, 341b, 342a, 342b, and 342c may be terminals capable of applying an artificial neural network according to the present disclosure.

Unlike the case of FIG. 3A, FIG. 3B illustrates a case in which terminals are configured as two different groups. The terminals 341a and 341b may be terminals of a first group, and the terminals 342a, 342b, and 342c may be terminals of a second group. The terminals 341a and 341b of the first group may have the same identification indicator. As an example of the same identification indicator, the same TCI in PDSCH configuration information may be used as described above. When the same identification indicator is a TCI, the terminals 342a to 342c may also have the same TCI in PDSCH configuration information. In this case, when a TCI indicating the terminals 341a and 341b of the first group is a TCI #1 and a TCI indicating the terminals 342a to 342c of the second group is a TCI #2, the TCI #1 and the TCI #2 may be set to different values.

In addition, the first group of the terminals 341a and 341b may share a first artificial neural network 332, and the second group of the terminals 342a, 342b and 342c may share a second artificial neural network 333. In this case, the first artificial neural network 332 and the second artificial neural network 333 may be used for the same purpose, but may be artificial neural networks of different types. Here, the same purpose may mean that, for example, both the first artificial neural network 332 and the second artificial neural network 333 are used as artificial neural networks for CSI feedback. In addition, the different types of artificial neural networks may mean that processing schemes of the first artificial neural network 332 and the second artificial neural network 333 are different and may have different outputs even though they have the same input values.

In the example of FIG. 3B, an artificial neural network is not illustrated in the base station 310. In a specific case, the base station 310 may use both the first artificial neural network 332 used by the terminals 341a and 341b of the first group and the second artificial neural network 333 used by the terminals 342a, 342b and 342c of the second group. In other words, the base station 310 may store the first artificial neural network 332 and the second artificial neural network 333 in an internal memory (not shown in FIG. 3A). The first artificial neural network 332 and the second artificial neural network 333 stored in the base station 310 may be driven by a processor(s) or the like, and may be used when communicating with the first group of terminals 341a and 341b and/or the second group of terminals 342a, 342b, and 342c. When the base station 310 communicates with the terminals using the artificial neural networks, the base station 310 may use the first artificial neural network 332 to communicate with the terminals 341a and 341b of the first group, and may use the second artificial neural network 333 to communicate with the terminals 342a, 342b, and 342c of the second group. Here, the communication may refer to transmission and/or reception of RF signals.

In FIG. 3B, the first artificial neural network 332 is exemplified at an upper side of each of the terminals 341a to 341b of the first group, and the second artificial neural network 333 is exemplified at an upper side of each of the terminals 342a to 342c in the same manner as described in FIG. 3A. The example of FIG. 3B is also for ease of understanding, and in fact, the artificial neural networks 332 and 333 may be stored in memories (not shown in FIG. 3A) inside the corresponding terminals 341a, 341b, and 342a to 342c, respectively, and may be driven by processors corresponding thereto, respectively.

In the present disclosure, both the first artificial neural network 332 and the second artificial neural network 333 may be artificial neural networks for CSI feedback described above. As another example, both the first artificial neural network 332 and the second artificial neural network 333 illustrated in FIG. 3B may be artificial neural networks related to beam management, which are currently being discussed in the 3GPP. As yet another example, both the first artificial neural network 332 and the second artificial neural network 333 illustrated in FIG. 3B may be artificial neural networks for positioning accuracy enhancement, which are being currently discussed in the 3GPP. In addition, the artificial neural networks illustrated in FIG. 3B may be artificial neural networks based on various schemes to which AI/ML is applied other than the schemes discussed in the 3GPP.

Although the present disclosure describes the base station 310 and the terminals 341a, 341b, 342a, 342b, and 342c in the communication system based on the 3GPP NR technical specifications, the present disclosure may be applied to other wireless communication systems each comprising a transmitting node and a receiving node. In addition, in FIG. 3B, only five terminals have been described as an example, but those skilled in the art may understand that more terminals may belong to the base station 310. In addition, although only two groups have been described in FIG. 3B, the present disclosure may be applied even when three or more groups exist.

As described above, the artificial neural networks 332 and 333 illustrated in FIG. 3B may all be artificial neural networks for CSI feedback described above. However, the artificial neural networks 332 and 333 may be artificial neural networks that generate CSI feedback in different manners. As another example, the artificial neural networks 332 and 333 illustrated in FIG. 3B may all be artificial neural networks related to beam management, which are currently being discussed in the 3GPP. In this case, the artificial neural networks 332 and 333 may be artificial neural networks that generate information related to beam management in different manners. As yet another example, the artificial neural networks 332 and 333 illustrated in FIG. 3B may all be artificial neural networks for positioning accuracy enhancement, which are being currently discussed in the 3GPP. Even in this case, the artificial neural networks 332 and 333 may be artificial neural networks for generating positioning information in different manners. In addition, the artificial neural networks illustrated in FIG. 3B may be artificial neural network based on various schemes to which AI/ML is applied other than the methods discussed in the 3GPP.

Figure 3C:
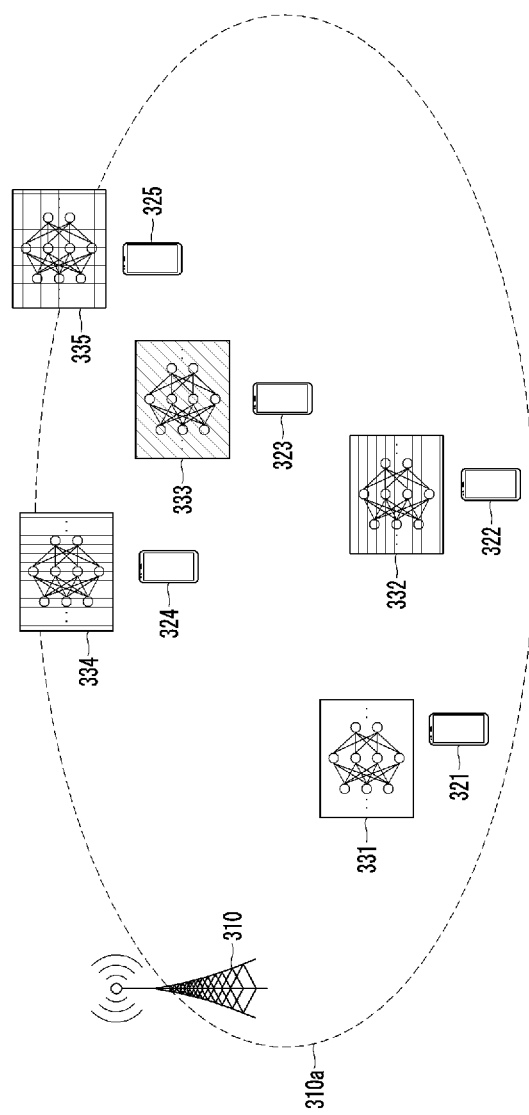
FIG. 3C is a conceptual diagram for describing artificial neural network sharing (or generation) according to Type 2 of the first exemplary embodiment of the present disclosure.

FIG. 3C is a conceptual diagram for describing artificial neural network sharing (or generation) according to Type 2 of the first exemplary embodiment of the present disclosure.

Referring to FIG. 3C, the base station 310 may correspond to a transmitting node and may have the communication coverage 310a based on a signal transmission distance. The base station 310 may communicate based on a communication scheme based on the 3GPP NR technical specifications, communicate based on 6G communication technical specifications to be supported in the future, and/or communicate based on other wireless communication scheme(s). In FIG. 3C, it may be assumed that the communication coverage 310a of the base station 310 corresponds to one cell. In the following description, the communication coverage 310a of the base station 310 will be described as being assumed as one cell.

Each of terminals 321, 322, 323, 324, and 325 located within the communication coverage of the base station 310 may correspond to a receiving node. All of the plurality of terminals 321 to 325 may be terminals capable of applying an artificial neural network according to the present disclosure. In addition, the terminals 321 to 325 illustrated in FIG. 3C may be all located within the communication coverage of the base station 310, and the terminals 321 to 325 may have different artificial neural networks 331, 332, 333, 334, and 335, respectively. In this case, the different artificial neural networks 331, 332, 333, 334, and 335 are used for the same purpose, but may be artificial neural networks of different types. In addition, although an artificial neural network is not illustrated in the base station 310 in the example of FIG. 3C, the base station 310 may use the same artificial neural networks as the artificial neural networks 331 to 335 of the terminals 321 to 325. In other words, the base station 310 may have a plurality of artificial neural networks 331 to 335 which are the same as those of the terminals 321 to 325 within its communication coverage 310a.

In addition, as described above, the different artificial neural networks 331 to 335 are respectively exemplified at upper sides of the terminals 321 to 325 in FIG. 3C. Since FIG. 3C is a conceptual diagram corresponding to Type 2 in which an artificial neural network is shared (or generated) in units of a terminal, the different artificial neural networks 331 to 335 may be respectively stored in internal memories (not shown in FIG. 3A) of the corresponding terminals 321 to 325. The artificial neural networks 331 to 335 may be driven by processors included in the corresponding terminals, respectively.

In the example of FIG. 3C, an artificial neural network is not exemplified in the base station 310, but the base station 310 may use all the artificial neural networks 331 to 335 used in the respective terminals 321 to 325. In other words, the base station 310 may store all the artificial neural networks 331 to 335 used by the respective terminals 321 to 325 in its internal memory. When the base station 310 communicates with a specific terminal, the base station 310 may communicate using an artificial neural network corresponding to the specific terminal. Here, the communication may refer to transmission and/or reception of RF signals. In FIG. 3C, the artificial neural networks 331 to 335 inside the base station 310 may be also driven by its processor(s) or the like.

The artificial neural networks 331 to 335 illustrated in FIG. 3C may all be artificial neural networks for CSI feedback described above. As another example, all of the artificial neural networks 331 to 335 illustrated in FIG. 3C may be artificial neural networks related to beam management, which are currently being discussed in the 3GPP. As yet another example, all of the artificial neural networks 331 to 335 illustrated in FIG. 3C may be artificial neural networks for positioning accuracy enhancement, which are being currently discussed in the 3GPP. In addition, all of the artificial neural networks 331 to 335 illustrated in FIG. 3C may be artificial neural networks based on various schemes to which AI/ML is applied other than the schemes discussed in 3GPP.

Although the present disclosure describes the base station 310 and the terminals 321 to 325 in the communication system based on the 3GPP NR technical specifications, the present disclosure may be applied to other wireless communication systems each comprising a transmitting node and a receiving node. A case when there is one receiving node in another wireless communication system, it may correspond to a case that only one specific terminal is included in the example of FIG. 3C. In addition, in FIG. 3C, only five terminals have been described as an example, but those skilled in the art may understand that more terminals can belong to the base station 310.

Figure 3D:
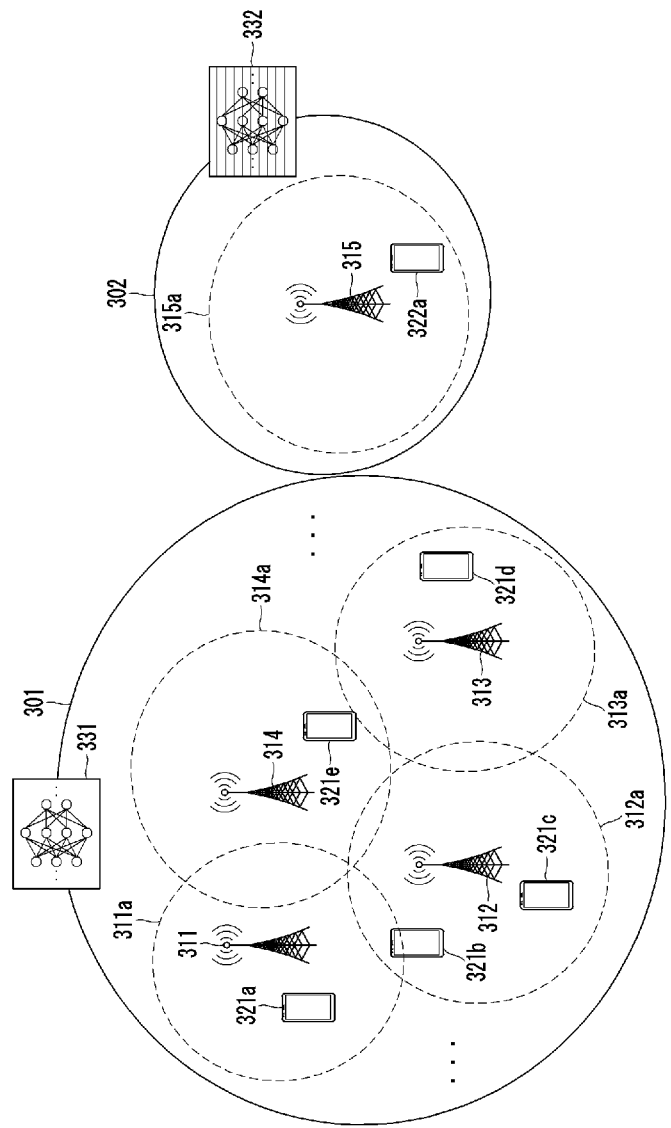
FIG. 3D is a conceptual diagram for describing artificial neural network sharing (or generation) according to Type 3 of the first exemplary embodiment of the present disclosure.

FIG. 3D is a conceptual diagram for describing artificial neural network sharing (or generation) according to Type 3 of the first exemplary embodiment of the present disclosure.

Referring to FIG. 3D, a plurality of base stations 311, 312, 313, 314, and 315 are illustrated, the base stations 311, 312, 313, and 314 among them are configured as a first group 301, and one base station 315 is configured as a second group 302. In FIG. 3D, only two groups are illustrated due to drawing limitations. However, more groups may be configured according to a manner to be described below. It should be noted that the configuration of the groups is also not limited by the number of base stations and/or terminals illustrated in FIG. 3D. In addition, in FIG. 3D, it may be assumed that each of communication coverages 311a, 312a, 313a, 314a, and 315a of the base stations 311, 312, 313, 314, and 315 corresponds to one cell. In the following description, each of the communication coverages 311a, 312a, 313a, 314a, and 315a of the base stations 311, 312, 313, 314, and 315 will be described as being assumed as one cell.

Each of the base stations 311, 312, 313, 314, and 315 illustrated in FIG. 3D may all correspond to a transmitting node, and the base stations 311, 312, 313, 314, and 315 may have the communication coverages 311a, 312a, 313a, 314a, and 315a based on respective signal transmission distances. Each of the base stations 311, 312, 313, 314, and 315 may communicate based on a communication scheme based on the 3GPP NR technical specifications, communicate based on 6G communication technical specifications to be supported in the future, and/or communicate based on other wireless communication scheme(s).

Each of terminals 321a, 321b, 321c, 321c, 321d, and 321e located within the first group 301 and the terminal 322a located within the second group 302 may correspond to a receiving node. In addition, all of the terminals 321a to 321e and 322a illustrated in FIG. 3D may be terminals capable of applying an artificial neural network according to the present disclosure. In addition, each of the terminals 321a to 321e and 322a illustrated in FIG. 3D may communicate within a communication coverage of a specific base station. Since each of the terminals 321a to 321e and 322a illustrated in FIG. 3D communicate within the communication coverage of the specific base station, it may have artificial neural networks 331 and 332 corresponding to a group to which the specific base station belongs. For example, the terminals 321a to 321e located within the first group 301 may use the first artificial neural network 331, and the terminals 322a located within the second group may use the second artificial neural network 332. Similarly to the terminals, the base stations 311, 312, 313, and 314 belonging to the first group 301 may all use the first artificial neural network 331, and the base station 315 belonging to the second group 302 may use the second artificial neural network 332.

In the first exemplary embodiment of the present disclosure, the first artificial neural network 332 and the second artificial neural network 333 are used for the same purpose, but may be artificial neural networks of different types. Here, the same purpose may mean that, for example, both the first artificial neural network 332 and the second artificial neural network 333 are used as artificial neural networks for CSI feedback. In addition, the different types of artificial neural networks may mean that processing schemes of the first artificial neural network 332 and the second artificial neural network 333 are different and may have different outputs even though they have the same input values.

Accordingly, in the present disclosure, all the base stations 311, 312, 313, and 314 operating as transmitting nodes and all the terminals 321a to 321e operating as receiving nodes in the first group 301 may all use the same first artificial neural network 331.

In addition, as described above, the artificial neural networks 331 to 332 are respectively illustrated at upper sides of the respective groups 301 and 302 in FIG. 3D. The example of FIG. 3D is for ease of understanding as described above, and in fact, the artificial neural networks 331 to 332 may be stored in the memories (not shown in FIG. 3D) inside the base stations 311 to 315 and the terminals 321a to 321e and 322a, and may be driven by the corresponding processors or the like.

The artificial neural networks 331 to 332 illustrated in FIG. 3D may all be artificial neural networks for CSI feedback described above. As another example, all of the artificial neural networks 331 to 332 illustrated in FIG. 3D may be artificial neural networks related to beam management, which are currently being discussed in the 3GPP. As yet another example, all of the artificial neural networks 331 to 332 illustrated in FIG. 3D may be artificial neural networks for positioning accuracy enhancement, which are being currently discussed in the 3GPP. In addition, all of the artificial neural networks 331 to 335 illustrated in FIG. 3D may be artificial neural networks based on various schemes to which AI/ML is applied other than the schemes discussed in the 3GPP.

Although the present disclosure describes the base stations 311 to 315 and the terminals 321a to 321c and 322a in the communication system based on the 3GPP NR technical specifications, the present disclosure may be applied to other wireless communication systems each comprising a transmitting node and a receiving node.

With reference to FIGS. 3A to 3D described above, the configuration of the artificial neural network according to the first exemplary embodiment of the present disclosure will be described in more detail.

When configuring an artificial neural network to the terminal, the base station or base station group may configure one of the four types as described above according to a type to be operated. In other words, when the base station (or, base station group) configures the artificial neural network to the terminal, the base station may generate artificial neural network sharing (or generation) type information for the cell-based sharing (or generation), terminal group-based sharing (or generation), terminal-based sharing (or generation), or cell group-based sharing (or generation). When the base station desires to share (or generate) the artificial neural network with each terminal, a part of the terminals, or all terminals according to the first exemplary embodiment of the present disclosure, the base station may need to manage the artificial neural networks used by the terminals. Therefore, when the base station shares (or generates) the artificial neural network according to the present disclosure to the terminals, it is necessary to consider the capability of the base station.

Meanwhile, the terminal may manage information on artificial neural network(s) based on the received artificial neural network sharing (or generation) type information. For example, in the case of a cell-based artificial neural network, each of the terminals may manage information on artificial neural network(s) in a storage space classified according to a cell ID. As another example, in the case of a terminal group-based artificial neural network (e.g., artificial neural network for a terminal group designated for the same TCI), each of terminals belonging to the terminal group may manage information on artificial neural network(s) in a storage space classified according to an indicator representing the terminal group.

In addition, the type in which an artificial neural network is shared (or generated) in units of a cell group may be defined. For example, an artificial neural network model shared by several adjacent cells by reflecting regional characteristics may exist. When supporting an artificial neural network model shared by multiple cells by reflecting regional characteristics, there is an advantage in that the artificial neural network model does not need to be initialized or changed when a terminal performs handover between the cells. As an example of this case, when configuring an artificial neural network for CSI feedback and/or an artificial neural network that identifies a positioning of a terminal in a specific region for positioning, the artificial neural network may be an artificial neural network that can be commonly used for a plurality of cells.

Meanwhile, the types of artificial neural networks described above may be configured to the terminals using various schemes. Various schemes may be used for the configuration, and examples of several schemes will be described.

First, the base station may indicate one or more of Type 0 to Type 3 using a specific message broadcast to all terminals communicating within its own cell. Accordingly, each of the terminals may share (or generate) an artificial neural network from the base station and/or through a separate server that provides the artificial neural network based on the type indicated by the specific message broadcast by the base station.

Second, the base station may inform the terminals of a type supported by the base station in a different manner based on each type provided by the base station.

For example, in the case of Type 0 artificial neural network sharing (or generation) in units of a cell or in the case of Type 3 artificial neural network sharing (or generation) in units of a cell group, the base station may indicate sharing (or generation) of the artificial neural network by using a specific message broadcasted by the base station.

As another example, in the case of Type 1 artificial neural network sharing (or generating) in units of a terminal and/or in the case of Type 2 artificial neural network sharing (or generating) in units of a terminal group, the base station may indicate sharing (or generation) of the artificial neural network by using a predefined configuration message configurable for each terminal (i.e., terminal (UE)-specific configuration message).

As yet another example, in the case of Type 2 artificial neural network sharing (or generating) in units of a terminal group, the base station may indicate sharing (or generation) of the artificial neural network by using a predefined configuration message configurable for each terminal group (i.e., terminal group-specific configuration message)

The operations of the base station described above are for ease of understanding as an example, and the respective types according to the first exemplary embodiment described in the present disclosure are not limited to the above description. In addition, the features of the first exemplary embodiment described above may be applied together with other exemplary embodiments to be described below within a range that they do not conflict with each other.

Second Exemplary Embodiment

According to a second exemplary embodiment of the present disclosure, when an artificial neural network for wireless communication is applied in a mobile communication system composed of a base station and one or more terminals as in the first exemplary embodiment described above, one or more sharing (or generation) types among the four types described in the first exemplary embodiment may be defined for the artificial neural network according to a sharing (or generation) scheme of the artificial neural network.

In the second exemplary embodiment according to the present disclosure, when the terminal reports capability information for an artificial neural network to the base station, a method of reporting information on sharing (or generation) types supported by the terminal for the artificial neural network is proposed. In the first exemplary embodiment described above, reporting of information on an artificial neural network from the terminal to the base station is not considered. In other words, the first exemplary embodiment assumes that an artificial neural network is configured by the base station without considering capability information of the terminal, for example, capability of the terminal. However, it will be apparent to those skilled in the art that the second exemplary embodiment and the first exemplary embodiment of the present disclosure may be considered and used together.

According to the second exemplary embodiment of the present disclosure, the terminal may report capability information for an artificial neural network to the base station. When the terminal reports the capability information to the base station, the terminal may report the capability information by including information on sharing (or generation) types supported by the terminal for the corresponding artificial neural network. For example, the terminal may report to the base station capability information including information on Type 0 to Type 3 described in the first exemplary embodiment. In the case of Type 1, a terminal group may be defined as terminals having the same identification indicator. In addition, sharing (or generating) an artificial neural network may mean that the same artificial neural network structure and/or model parameters (or weight vector) are applied to an application unit (e.g., terminal, terminal group, cell, or cell group).

As an exemplary embodiment of the present disclosure, it may be assumed that an artificial neural network for CSI feedback is applied in the mobile communication system composed of the base station and the terminal, such as the 5G NR system according to the 3GPP technical specifications. When a plurality of terminals within a cell desire to use the same code for the same CSI as in the existing codebook-based CSI feedback scheme, it may be preferable that the artificial neural network for CSI feedback is defined in units of a cell. In other words, all terminals within the cell may perform CSI encoding/decoding by applying the same artificial neural network structure and/or weight vector.

In order for all terminals within the cell to apply the same artificial neural network structure and weight vector, the terminals within the cell need to cooperate to train a single artificial neural network. In order to support operations in which the terminals within the cell cooperate to train the single artificial neural network, each of the terminals need to support 'federated learning'. However, there may be a terminal not capable of supporting the federated learning in consideration of a complexity and cost of the terminal.

Therefore, in the second exemplary embodiment of the present disclosure, when the terminal reports capability information for a specific artificial neural network to the base station, the terminal may report the capability information by including information on sharing (or generation) type(s) supported by the terminal for the specific terminal.

In addition, the four types according to the second exemplary embodiment of the present disclosure may be the same as those illustrated in FIGS. 3A to 3D while describing the first exemplary embodiment. Therefore, the four types according to the second exemplary embodiment of the present disclosure may apply the previously described FIGS. 3A to 3D.

In addition, the features of the second exemplary embodiment described above may be applied together with other exemplary embodiments to be described below as well as the first exemplary embodiment within a range that they do not conflict with each other.

Third Exemplary Embodiment

According to a third exemplary embodiment of the present disclosure, when applying an artificial neural network for wireless communication in a mobile communication system composed of a base station and one or more terminals, one or more of the following types of learning for the artificial neural network according to a scheme for training the artificial neural network.
(1) Type A: A type that does not support online learning (or a type that only supports offline learning)
(2) Type B: A type that supports online learning only in a terminal
(3) Type C: A type that supports online learning only in a base stations
(4) Type D: A type that supports online learning both in a base station and in a terminal A method of configuring learning type information for an artificial neural network when the base station configures the artificial neural network to the terminal will be proposed.

When configuring a learning type for an artificial neural network according to the third exemplary embodiment of the present disclosure, in the case of Type A, it may mean that an artificial neural network pre-trained in offline mode or by another network node may be used in inference processes.

In the present disclosure, similarly to the first and second exemplary embodiments described above, a case of applying an artificial neural network for CSI feedback and CSI encoding/decoding in the 5G NR mobile communication system including the base station and the terminal according to the 3GPP technical specifications may be assumed.

In the first exemplary embodiment of the present disclosure, the method of delivering information on sharing (or generation) type(s) for an artificial neural network when the base station configures the artificial neural network has been proposed. However, learning characteristics of the artificial neural network may not be completely described only with the sharing (or generation) type information.

For example, assume that an artificial neural network for CSI feedback is configured in units of a cell, and a plurality of terminals within a cell apply the same artificial neural network structure and weight vector. When the artificial neural network for CSI feedback is configured in units of a cell, learning of the artificial neural network for CSI feedback may be performed by the base station, the terminal, or both of the base station and the terminal.

The above description will be further clarified by taking an example. First, it may be assumed that a channel reciprocity between downlink and uplink is established in the 3GPP NR TDD system. When the above-described assumption is established, the base station may train the artificial neural network for CSI feedback using uplink channel information. Thereafter, the base station may deliver information on a model trained for the artificial neural network for CSI feedback to the terminals through a broadcast channel or the like.

When the above-described assumption is established, the terminal also may perform the training. When the terminal performs the training, each terminal may calculate a change amount in the weight vector of the artificial neural network for CSI feedback in the federated learning scheme. Thereafter, the terminal may report the calculated information on the change amount of the weight vector to the base station. Then, the base station may determine a final weight vector update direction based on the information received from the respective terminals.

Hereinafter, a method for applying the third exemplary embodiment of the present disclosure will be described using an artificial neural network for CSI feedback, which is one of various types discussed in the 3GPP for artificial neural networks. A description of a specific method described below, for example, using an artificial neural network for CSI feedback, is only for understanding, and should not be construed as limiting the present disclosure.

First, in the third exemplary embodiment, Type A is a case in which online learning is not supported for the artificial neural network. Accordingly, in the case of Type A, online learning for artificial neural networks is not performed either in the base station or in the terminal. However, Type A may support offline learning. When online learning is not supported as described above, the artificial neural network may be applied to the base station and the terminal as being initially configured. In other words, when online learning is not supported, the artificial neural network may be stored in the base station and/or terminal, and online learning may not proceed thereafter.

When online learning is not supported, if offline learning is performed for the artificial neural network, the base station and/or terminal may store the artificial neural network trained in offline mode, and does not proceed with learning of the artificial neural network that has been trained offline.

Figure 4A:
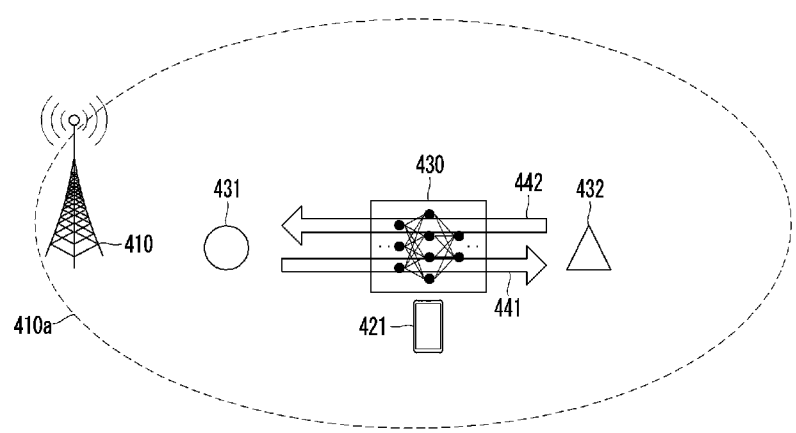
FIG. 4A is a conceptual diagram illustrating online learning of an artificial neural network according to Type B of the third exemplary embodiment of the present disclosure.

FIG. 4A is a conceptual diagram illustrating online learning of an artificial neural network according to Type B of the third exemplary embodiment of the present disclosure.

Referring to FIG. 4A, a base station 410 may correspond to a transmitting node and may have a communication coverage 410a based on a signal transmission distance. The base station 410 may communicate based on a communication scheme based on the 3GPP NR technical specifications, communicate based on 6G communication technical specifications to be supported in the future, and/or communicate based on other wireless communication scheme(s). In addition, in FIG. 4A, it may be assumed that the communication coverage 410a of the base station 410 corresponds to one cell. In the following description, the communication coverage 410a of the base station 410 will be described as being assumed as one cell.

In FIG. 4A, only one terminal 421 is illustrated within the communication coverage 410a of the base station 410 for convenience of description. The terminal 421 may be a terminal capable of applying an artificial neural network 430 according to the present disclosure. In addition, the terminal 421 may be a terminal capable of supporting online learning of the artificial neural network 430. For example, a case in which the artificial neural network 430 is an artificial neural network for CSI feedback will be assumed and described.

The base station 410 may transmit a reference signal to measure CSI. Then, the terminal 421 may measure a channel state based on the reference signal transmitted from the base station 410. When measuring the channel state, the terminal 421 may measure the channel state using the artificial neural network 430 for CSI feedback. For example, an input 431 to the artificial neural network 430 for CSI feedback may be the reference signal received from the terminal 421, and an output 432 of the artificial neural network 430 for CSI feedback may be CSI feedback information.

In FIG. 4A, the artificial neural network 430 may be an artificial neural network capable of online learning according to the present disclosure. The artificial neural network 430 may include input nodes receiving the input 431 and output nodes outputting a final result. The output 432, which is the final result output from the output nodes, may be referred to as a label or ground truth. In addition, hidden nodes are included between the input nodes and the output nodes, and the respective hidden node may have weights. The input of the artificial neural network 430 may be subject to calculation based on the weights of the respective hidden nodes located between the input nodes and the output nodes. The calculation process from the input nodes to the output nodes as described above may be referred to as forward propagation 441.

The forward propagation described above is a form of simply using the artificial neural network 430. However, learning of the artificial neural network 430 may be performed by performing backward propagation 442 of the final result through the hidden nodes to verify the weights. When verifying the weights, the terminal 421 may support federated learning by lowering the weights of hidden nodes having a high error rate during the forward propagation through the backward propagation or by reporting information on the weights of the hidden nodes to the base station 410. In the following description, information on changes in the weights of the hidden nodes will be referred to as 'weight vector change information'.

In addition, in the present disclosure, it may be assumed that such the learning is online learning. The online learning according to the present disclosure may be a process in which the artificial neural network used for inference is trained in (near-) real-time with arrival of new training samples. According to such the real-time process, the artificial neural network may generally be continuously trained.

The online learning described in the present disclosure may mean training the artificial neural network 430 in real-time or near real-time. In the present disclosure, a distinction between (near) real-time and non-real-time depends on a circumstance and may be relative to a timescale.

In FIG. 4A, only one terminal 421 is illustrated for convenience of description. However, it is obvious to those skilled in the art that a plurality of terminals may communicate within the communication coverage 410a of the base station 410. Accordingly, each terminal located within the communication coverage 410a of the base station 410 may report the weight vector change information for the artificial neural network 430 that each terminal is running to the base station 410 for federated learning.

As another example, when a terminal alone or each terminal has an individual artificial neural network, the terminal may perform online learning by immediately lowering the weights of the hidden nodes with a high error rate during forward propagation.

Meanwhile, the terminal 421 may separately update (or store) the weight vector change information of the artificial neural network 430 for CSI feedback. As another example, the terminal 421 may provide the weight vector change information of the artificial neural network 430 to the base station 410 for federated learning. In an exemplary embodiment of the present disclosure, a method in which the base station 410 leads the update of the artificial neural network during federated learning will be assumed and described. However, when a separate server for online learning other than the base station 410 may be used. In the case of having a separate online learning server for online learning of the artificial neural network of the terminal 421, the online learning server may be located in an upper network of the base station. In the following description, for convenience of description, it will be described that the base station 410 leads online learning of the artificial neural network 430 for CSI feedback of the terminal 421 during federated learning.

As described above, although only one terminal 421 is illustrated in FIG. 4A, if Type 0, Type 2, or Type 3 of the first exemplary embodiment described above is applied and federated learning is required, the base station 410 may receive the weight vector change information from a plurality of terminals for the artificial neural network according to the same purpose and the same type. For example, the weight vector change information received by the base station 410 may aggregate information on artificial neural networks for CSI feedback having the same vector weight among artificial neural networks for the same purpose (i.e., artificial neural networks for CSI feedback). For example, as described in Type 1 of the first exemplary embodiment, when the first artificial neural network 332 for CSI feedback and the second artificial neural network 333 for CSI feedback exist, only information on the first artificial neural network 332 for CSI feedback may be aggregated. In the case of Type 2 described in the first exemplary embodiment, the weight vector change information for an artificial neural network for CSI feedback for each terminal may be received.

Accordingly, when the federated learning is performed, the base station 410 may receive the weight vector change information from a plurality of terminals or from one specific terminal for a specific artificial neural network. The base station 410 receiving the weight vector change information from a plurality of terminals may determine an update direction of the weight vector based on the received weight vector change information. When the update direction of the weight vector is determined, the base station 410 may provide weight vector update information to the corresponding terminal(s). Here, the weight vector update information may be weight vector information for updating the weights of the hidden nodes of the artificial neural network based on the update direction of the weight vector, which is determined by the base station. Each terminal receiving the weight vector update information may update the weights of the artificial neural network based on the weight vector update information received from the base station. In other words, the weight vector of the artificial neural network 430 of the terminal 421 illustrated in FIG. 4A may be updated based on the weight update information.

Figure 4B:
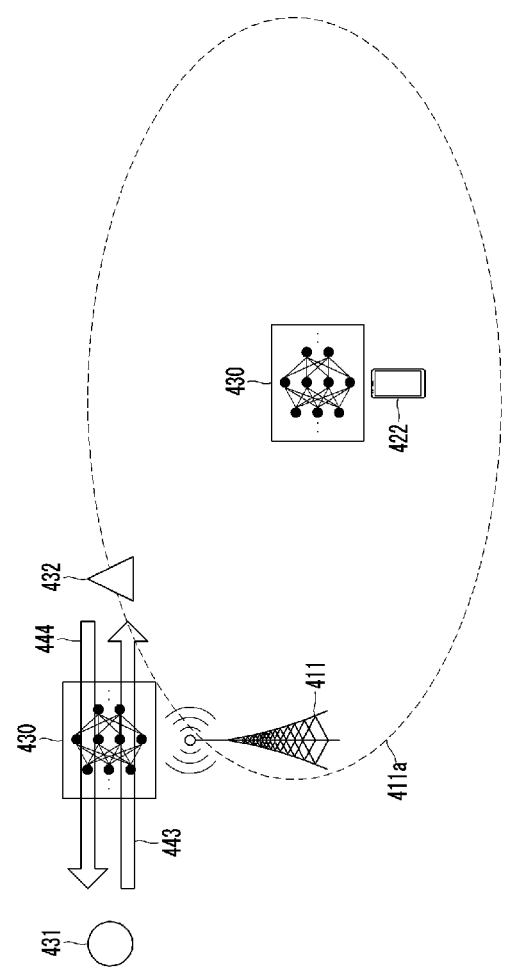
FIG. 4B is a conceptual diagram illustrating online learning of an artificial neural network according to Type C of the third exemplary embodiment of the present disclosure.

FIG. 4B is a conceptual diagram illustrating online learning of an artificial neural network according to Type C of the third exemplary embodiment of the present disclosure.

Referring to FIG. 4B, a base station 411 may correspond to a transmitting node and may have a communication coverage 411a based on a signal transmission distance. The base station 411 may communicate based on a communication scheme based on the 3GPP NR technical specifications, communicate based on 6G communication technical specifications to be supported in the future, and/or communicate based on other wireless communication scheme(s). In FIG. 4B, it may be assumed that the communication coverage 411a of the base station 411 corresponds to one cell. In the following description, the communication coverage 411a of the base station 411 will be described as being assumed as one cell. In addition, the base station 411 of FIG. 4B is a base station capable of performing online learning according to the exemplary embodiment of the present disclosure, and has a different reference numeral from that of FIG. 4A.

The terminal 422 may correspond to a receiving node of the wireless communication system and may be a terminal to which the artificial neural network 430 according to the present disclosure may be applied. However, unlike in FIG. 4A, the terminal 422 may be a terminal not capable of performing online learning for the artificial neural network 430. In other words, since FIG. 4B corresponds to Type C in which only the base station 411 supports online learning, the terminal 422 illustrated in FIG. 4B is not capable of performing online learning for the artificial neural network. Therefore, the terminal 422 illustrated in FIG. 4B uses a different reference numeral from the terminal 421 described in FIG. 4A.

As described above with reference to FIG. 4A, a case in which the artificial neural network 430 is an artificial neural network for CSI feedback will be assumed and described also in the exemplary embodiment of FIG. 4B. In addition, it may be assumed that a channel reciprocity between a downlink from the base station 411 to the terminal 422 and a uplink from the terminal 422 to the base station 411 is established. When the above-described assumption is established, the base station 411 may perform learning of the artificial neural network 430 for CSI feedback by utilizing uplink channel information received from the terminal 422. For example, the artificial neural network 430 for CSI feedback may acquire CSI feedback information as an output 432 by performing forward propagation 443 using a reference signal received from the terminal 422 as an input 431. The artificial neural network for CSI feedback 430 may perform backward propagation 444 on the CSI feedback information which is the output 432 to detect and store a change amount in the weight vector for the artificial neural network 430 for CSI feedback. In FIG. 4B, since forward propagation 443 and backward propagation 444 are performed in the base station 411, reference numerals different from those in FIG. 4A are used.

The base station 411 may obtain and store the change amount of the weight vector for the artificial neural network 430 for CSI feedback obtained through the forward propagation 443 and the backward propagation 444, that is, weight vector change information. Then, the base station 411 may update the weights of the artificial neural network 430 for CSI feedback based on weight vector information. In other words, the base station 411 may perform online learning of the artificial neural network 430 for CSI feedback based on the weight vector information. Since the online learning described in the present disclosure is the same as described in FIG. 4A, the same description will be omitted.

On the other hand, when required due to a computational capability of the base station 411, an online learning server (not shown in FIG. 4B) for updating the weights of the artificial neural network 430 for CSI feedback may perform calculation of the weight vectors on behalf of the base station 411. If a separate online learning server is provided, the online learning server may be connected to an upper network of the base station. However, in the present disclosure described below, for convenience of description, a case in which the base station 411 calculates the weight vector of the artificial neural network 430 for CSI feedback, that is, a case where online learning is performed will be assumed and described.

The base station 411 may generate weight vector update information when the weight vector of the artificial neural network 430 for CSI feedback needs to be updated based on the calculation of the weight vector of the artificial neural network 430 for CSI feedback, and update the neural network 430 of the base station 411.

Thereafter, the base station 411 may transmit the generated weight vector update information to the terminal 422 as needed. Here, the weight vector update information may be information for changing weight vectors applied to at least one node among nodes in the artificial neural network 430 for CSI feedback. As another example, the weight vector update information may be the updated artificial neural network 430 for CSI feedback itself.

For example, when Type 0 to Type 2 described above in the first exemplary embodiment are applied, the base station 411 may provide update information on the artificial neural network to the terminals belonging to the base station 411. Then, the terminal that needs to update the corresponding artificial neural network within the base station 411 may receive the update information on the artificial neural network, and update the corresponding artificial neural network.

Meanwhile, in the case of Type 3, since the base station 411 needs to change the artificial neural network for a cell group, the base station 411 may update the artificial neural network through cooperation with other base stations (not illustrated in FIG. 4B). If the artificial neural network is updated through cooperation with other base stations, the base station 411 may provide artificial neural network update information to terminals within its own cell. Accordingly, the terminal receiving the artificial neural network update information from the base station 411 may update the corresponding artificial neural network 430.

Figure 4C:
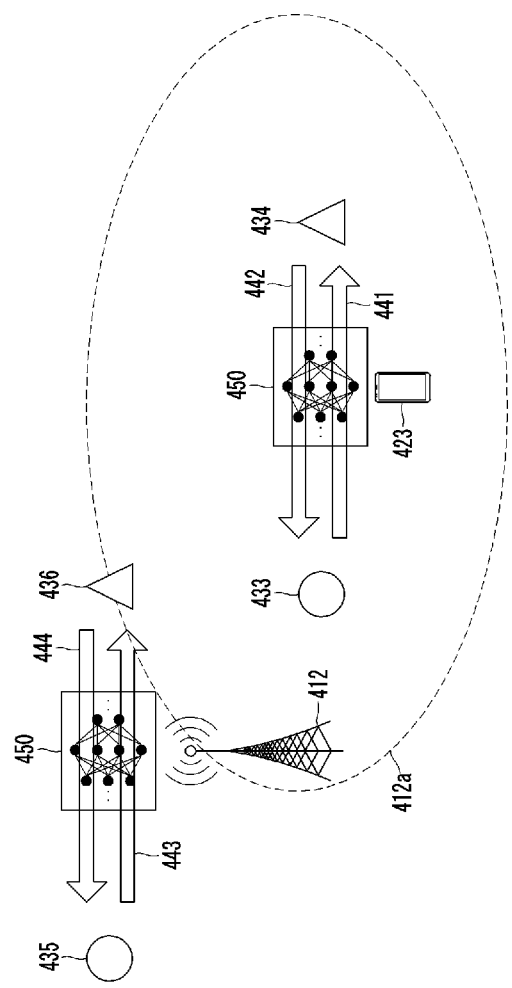
FIG. 4C is a conceptual diagram illustrating online learning of an artificial neural network according to Type D of the third exemplary embodiment of the present disclosure.

FIG. 4C is a conceptual diagram illustrating online learning of an artificial neural network according to Type D of the third exemplary embodiment of the present disclosure.

Referring to FIG. 4C, a base station 412 may correspond to a transmitting node and may have a communication coverage 412a based on a signal transmission distance. The base station 412 may communicate based on a communication scheme based on the 3GPP NR technical specifications, communicate based on 6G communication technical specifications to be supported in the future, and/or communicate based on other wireless communication scheme(s). In FIG. 4C, it may be assumed that the communication coverage 412a of the base station 412 corresponds to one cell. In the following description, the communication coverage 412a of the base station 412 will be described as being assumed as one cell. The base station 412 of FIG. 4C may be a base station capable of performing online learning according to the exemplary embodiment of the present disclosure, and the terminal 423 may also be a terminal capable of performing online learning according to the exemplary embodiment of the present disclosure.

The terminal 423 may perform online learning for an artificial neural network 350 in the same manner as described above with reference to FIG. 4A. For example, when the artificial neural network 350 is an artificial neural network for CSI feedback, a reference signal transmitted by the base station may be an input 433 or an input sample. An output 434 may be obtained through forward propagation 411 using the reference signal. Under the above-described assumption, the output 434 may be CSI feedback information. In addition, as described above, the artificial neural network 450 may be verified, and weight vector change information may be obtained through backward propagation 442. When the terminal 423 performs federated learning, weight vector information may be provided to the base station 412. When the terminal does not perform federated learning, the terminal may update the artificial neural network 450 based on a result of its own online learning.

In addition, the base station 412 may perform online learning for the artificial neural network 450 as described above with reference to FIG. 4B. Specifically, the base station 412 may use a specific signal received from the terminal 423, for example, a reference signal as an input sample. In other words, an input 435 may be a reference signal transmitted by the terminal 423 in uplink. Even in this case, a channel reciprocity between a downlink from the base station 412 to the terminal 423 and an uplink from the terminal 423 to the base station 412 may be established as described above with reference to FIG. 4B. Then, base station 412 may obtain an output 436 of the artificial neural network 450 through forward propagation 443. In addition, the base station 412 may verify an output 436 through backward propagation of the artificial neural network 450. Based on a result of the verification, the base station 412 may obtain weight vector change information. The base station 412 may update the artificial neural network 450 based on the weight vector change information. In addition, when necessary, the base station 412 may provide update information of the artificial neural network 450 to the terminal 423. Such the provision scheme may be a terminal-specific scheme, a scheme of broadcasting to all terminals, or a terminal group-specific scheme. In other words, the update information of the artificial neural network 450 may be provided to the terminal correspondingly to Type 0 to Type 2 described above in the first exemplary embodiment.

In addition, if the base station 412 supports Type 3 described in the first exemplary embodiment of the present disclosure and updates the artificial neural network through federated learning with other base stations belonging to the same cell group, the update information of the artificial neural network 450 may be provided to all terminals belonging to the base station.

The types of artificial neural networks according to the third exemplary embodiment described above, specifically Type A to Type D, may be notified to the terminals by the base station. A method in which the base station informs the terminals of the online learning type of the artificial neural network will be described by taking several examples.

First, the base station may indicate Type A to Type D using a specific message broadcast to all terminals communicating within its own cell. Accordingly, each of the terminals may determine whether to perform online learning of the artificial neural network based on the type indicated by the specific message broadcast by the base station.

Second, the base station may inform the terminals of the types supported by the base station in different manners based on the respective types configured in the base station.

For example, in the case of Type A not supporting online learning and/or in the case of supporting online learning only in the base station, the base station may indicate online learning of the artificial neural network using a specific message broadcasted by the base station.

As another example, in the case of Type B supporting online learning only in the terminal and/or Type D supporting online learning both in the base station and in the terminal, the base station may indicate online learning of the artificial neural network using a predetermined configuration message configurable for each terminal capable of online learning.

In the case of Type B and/or Type D, the base station may indicate online learning of the artificial neural network using a predetermined configuration message configurable for each terminal group of terminals capable of online learning.

The third exemplary embodiment described above also may be applied together with other exemplary embodiments to be described below as well as the exemplary embodiments described above within a range that they do not conflict with each other.

Fourth Exemplary Embodiment

According to a fourth exemplary embodiment of the present disclosure, when an artificial neural network for wireless communication is applied in a mobile communication system composed of a base station and one or more terminals, learning types may be defined in the same manner as Type A to Type D described in the third exemplary embodiment.

In the case of Type A in the fourth exemplary embodiment of the present disclosure, an artificial neural network pre-trained in offline mode or by other network node may be used for inference processes.

Also in the fourth exemplary embodiment of the present disclosure, it may be assumed that an artificial neural network for encoding/decoding CSI is applied in the mobile communication system composed of the base station and the terminal, such as the 5G NR system according to the 3GPP technical specification, as previously assumed. In this case, it may be assumed that the artificial neural network for encoding/decoding CSI is an artificial neural network for CSI feedback.

In the second exemplary embodiment of the present disclosure, the method for a terminal to report capability information for an artificial neural network has been described. Specifically, the terminal may report capability information to the base station by including sharing (or generating) type information for the artificial neural network.

However, the learning characteristics of the artificial neural network may not be completely described only with the sharing (or generation) type information of the artificial neural network described in the second exemplary embodiment. For example, when a specific terminal is designed and implemented to have low complexity for cost reduction, an operation of using an offline-trained or pre-trained artificial intelligence model for inference may be supported, but an operation of supporting online learning by the terminal itself may not be possible.

Therefore, in the fourth exemplary embodiment of the present disclosure, when the terminal reports capability information for the artificial neural network to the base station, the terminal may reports the capability information by including information on the learning types supportable by the terminal for the artificial neural network. In other words, in the fourth exemplary embodiment of the present disclosure, when the terminal reports capability information for the artificial neural network to the base station and/or network, the terminal may report information on learning types supportable by the base station for the corresponding artificial neural network.

For example, if the terminal does not support online learning, when the terminal reports capacity information of the terminal to the base station, the terminal may report to the base station that the terminal supports only Type A and/or Type C. As another example, if the terminal is capable of supporting online learning, the terminal may also report whether support for federated learning is possible. In this case, when reporting the capability information of the terminal to the base station, the terminal may report the capability information by indicating that the terminal supports Type B and/or Type D or by indicating that the terminal support all types.

The fourth exemplary embodiment described above also may be applied together with other exemplary embodiments to be described below as well as the first to third exemplary embodiments described above within a range that they do not conflict with each other.

Fifth Exemplary Embodiment

In a fifth exemplary embodiment of the present disclosure, when an artificial neural network for wireless communication is applied in a mobile communication system composed of a base station and one or more terminals, types for the artificial neural network may be defined in the same manner as described in the first exemplary embodiment. For example, one or more among Type 0 in which the artificial neural networks is shared (or generated) in units of a cell, Type 1 in which the artificial neural network is shared (or generated) in units of a terminal group, Type 2 in which the artificial neural network is shared (or generated) in units of a terminal, or Type 3 in which the artificial neural network is shared (or generated) in units of a cell group may be defined.

In addition, the fifth exemplary embodiment of the present disclosure may define learning type(s) for the artificial neural network as described in the above-described third exemplary embodiment. For example, Type A of supporting only offline learning (no online learning), Type B of supporting online learning only in a terminal, Type C of supporting online learning only in a base station, and/or Type D of supporting online learning both in a base station and a terminal may be defined.

In the fifth exemplary embodiment of the present disclosure, based on a unit in which the artificial neural network is configured and whether or not online learning is supported, the learning type(s) supportable for the artificial neural network may be specified for each sharing (or generation) type of the artificial neural network as follows. The learning type(s) of the artificial neural network supportable for each sharing (or generation) type of the artificial neural network may be specified as shown in Table 1 below.

TABLE 1

|        | Type 0 | Type 1 | Type 2 | Type 3 |
|--------|--------|--------|--------|--------|
| Type A | O      | O      | O      | O      |
| Type B | O      | O      | O      | —      |
| Type C | O      | —      | —      | —      |
| Type D | O      | O      | —      | O      |

In <Table 1> above, 'O' expresses 'supported'.

In an exemplary embodiment of the present disclosure, it may be assumed that an artificial neural network for CSI encoding/decoding is applied in a mobile communication system composed of a base station and a terminal, such as the 5G NR system according to the 3GPP technical specifications. The artificial neural network for CSI encoding/decoding may be assumed as an artificial neural network for CSI feedback. It may be assumed that the base station determines that the channel characteristics of each terminal are different, and configures an artificial neural network for CSI feedback to be defined in units of a terminal (e.g., Type 2). In this case, performing learning on the artificial neural network in the base station may be a learning type with low feasibility. This is because a calculation load of a process in which the base station trains a different artificial neural network of each terminal for all terminals may be very high. Therefore, the present disclosure proposes a method of specifying learning type(s) supported for each sharing (or generation) type of the artificial neural network as shown in Table 1.

As in the example of <Table 1>, when an artificial neural network is defined for each terminal, an agreement between the base station and the terminal may be made in advance to support only offline learning or online learning in units of a terminal. When supportable combinations of artificial neural network sharing (or generation) types and artificial neural network learning types are specified as in the method proposed in the present disclosure, there is an advantage in preventing the terminal from implementing unnecessary functions.

The fifth embodiment of the present disclosure described above may also be applied together within a range that does not conflict with the first to fourth embodiments described above and/or other embodiments to be described below.

The fifth exemplary embodiment described above also may be applied together with other exemplary embodiments to be described below as well as the first to fourth exemplary embodiments described above within a range that they do not conflict with each other.

Sixth Exemplary Embodiment

In a sixth exemplary embodiment of the present disclosure, when an artificial neural network for wireless communication is applied in a mobile communication system composed of a base station and one or more terminals, in particular, when the base station configures the artificial neural network to a terminal, the base station may configure a reporting scheme of learned information including one or more information below.

(1) Information on a (maximum) temporal interval for reporting online learned information
(2) Information on a (periodic) time of aggregating online learning In addition, the sixth exemplary embodiment of the present disclosure proposes a method of aggregating learned information using one or more of the following methods.

(1) A method in which the terminal reports newly learned information within a (maximum) temporal interval from a previous report on learned information, and the base station aggregates only the learned information reported within the (maximum) temporal interval from the previous report as valid information
(2) A method in which information on (periodic) times (e.g., $T_1, T_2, \ldots, T_{N-1}, T_N$) for aggregating information obtained by online learning is agreed in advance between the base station and the terminal, and information obtained by a specific online learning, which is reported for a time period from $T_{K-1}$ to $T_K$, is collected at the (periodic) time $T_K$ for the specific online learning In this case, the learned information may be the entire model (or model parameters) at the corresponding time or a difference between the configured model (before learning) and the model after learning.

The model parameters according to the present disclosure may be the structure and weight vector of the artificial neural network, which are described above. In addition, the difference between the models according to the present disclosure may be the change amounts of the weight vector described above. Therefore, in each of the exemplary embodiments described above, the weight vector and/or the weight vector and the structure of the artificial neural network may be understood as model parameters. In addition, in each of the above-described exemplary embodiments, the change amounts in the weight vector may be understood as the difference between the models.

In an exemplary embodiment of the present disclosure, it may be assumed that an artificial neural network for CSI encoding/decoding is applied in a mobile communication system composed of a base station and a terminal, such as the 5G NR system according to the 3GPP technical specifications. The artificial neural network for CSI encoding/decoding may be assumed as an artificial neural network for CSI feedback.

When a plurality of terminals within a cell desire to use the same code for the same CSI, such as the codebook-based CSI feedback scheme defined in the 5G NR system according to the 3GPP technical specification, it may be preferable that the artificial neural network for CSI feedback is defined in units of a cell. In other words, all terminals within a cell may perform CSI encoding/decoding by applying the same artificial neural network structure and weight vectors.

However, in order for all terminals within the cell to apply the same artificial neural network structure and weight vectors, the terminals within the cell may need to cooperate to train a single artificial neural network. In order to cooperatively train a single artificial neural network, the respective terminals may need to support federated learning. When two or more terminals perform federated learning within the cell, the base station may need to aggregate (or collect) learned information (e.g., the entire model or the difference from the previous model) from the plurality of terminals. In addition, times for aggregating the learned information may need to be agreed upon in advance between the base station and the terminals.

In the present disclosure, when the base station configures the artificial neural network to the terminal based on the above-described issues, the base station may be configure to deliver information on a (maximum) temporal interval for reporting the online-learned information. In addition, the terminal may report information newly learned within the (maximum) temporal interval from a previous reporting time of learned information. Based on the report of the terminal, the base station may aggregate only the learned information reported within the (maximum) time interval from the previous reporting time as valid information.

For example, the base station may consider an operation in which a decoder part of the artificial neural network is fixed at the base station at the time of delivering the artificial neural network, a model to be actually applied in each terminal is fixed, and a model to be updated is delivered to the base station before a maximum temporal interval at which the update needs to be performed elapses.

As another method, when the base station configures the artificial neural network in the terminal, a method in which information on (periodic) times (e.g., $T_1, T_2, \ldots, T_{N-1}, T_N$) for aggregating information obtained by online learning is provided to the terminal, and information obtained by a specific online learning, which is reported for a time period from $T_{K-1}$ to $T_K$, is aggregated at the (periodic) time $T_K$ for the specific online learning may be considered.

Figure 5:
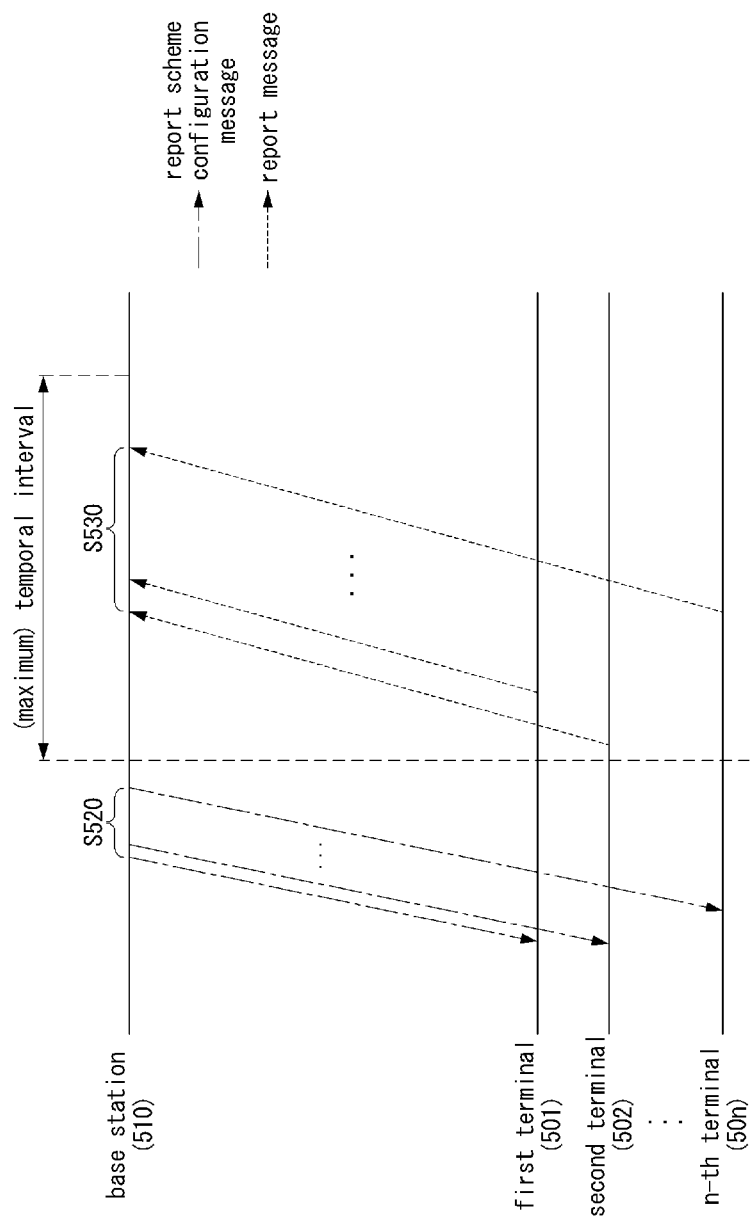
FIG. 5 is a timing diagram for describing artificial neural network configuration and learned information reporting according to the sixth exemplary embodiment of the present disclosure.

FIG. 5 is a timing diagram for describing artificial neural network configuration and learned information reporting according to the sixth exemplary embodiment of the present disclosure.

Referring to FIG. 5, a base station 510 and a plurality of terminals 501, 502, . . . , 50n are illustrated. The plurality of terminals 501, 502, . . . , 50n illustrated in FIG. 5 may be within a communication coverage (not shown) of the base station 510, and may all be terminals capable of using artificial neural networks. The base station 510 may be also a base station capable of using artificial neural networks.

The base station 510 may transmit a report scheme configuration message to the terminals 501, 502, . . . , 50n (S520). As described above, the report scheme configuration message may include information on the (maximum) temporal interval for reporting learned information or information on the (periodic) time for aggregating learned information. In addition, the report scheme configuration message may be broadcast to all terminals using the same type of artificial neural network or one artificial neural network. Alternatively, as illustrated in FIG. 5, the report scheme configuration message may be transmitted to each of the terminals 501, 502, . . . , and 50n individually.

In the following description, it may be assumed that an artificial neural network for CSI encoding/decoding is applied to the base station 510. In this case, the artificial neural network for CSI encoding/decoding may be assumed as an artificial neural network for CSI feedback. Then, the base station 510 may transmit the report scheme configuration message including the information on the (maximum) temporal interval for reporting learned information or the information on the (periodic) times for aggregating learned information to the terminals 501, 502, . . . , and 50n) in the broadcast manner or in the individual manner.

Each of the terminals 501, 502, . . . , and 50n may receive the report scheme configuration message for the artificial neural network for CSI feedback transmitted by the base station in the step S520. Accordingly, each of the terminals 501, 502, . . . , and 50n may determine a reporting time for the artificial neural network for CSI feedback based on the received report scheme configuration message.

Meanwhile, the base station 510 may set the (maximum) temporal interval at a predetermined time after transmitting the report scheme configuration message to the respective terminals. In FIG. 5, the (maximum) temporal interval is illustrated at the upper side of the base station. It should be noted that the (maximum) temporal interval illustrated in FIG. 5 is only an example for convenience of understanding, and the present disclosure is not limited to the example illustrated in FIG. 5.

Thereafter, the terminals 501, 502, . . . , and 50n may perform learning of the artificial neural network for CSI feedback according to the present disclosure while communicating with the base station 510. It should be noted that FIG. 5 does not illustrate an operation in which each of the terminals 501, 502, . . . , and 50n trains the artificial neural network for CSI feedback.

When learning of the artificial neural network for CSI feedback is performed, each of the terminals 501, 502, . . . , and 50n may report a learning result of the artificial neural network for CSI feedback to the base station. Since a reporting time is based on learning of the artificial neural network, a reporting time of each of the terminals 501, 502, . . . , and 50n may be different. For example, the first terminal 501 may be assumed as the closest terminal in distance from the base station 510, the second terminal 502 may be assumed as the second nearest terminal in distance from the base station 510, and the n-th terminal 50n may be assumed as the furthest terminal in distance from the base station 510.

In the case where the base station 510 broadcasts the report scheme configuration message, the report scheme configuration message may be received based on a distance between the base station and each terminal. That is, the broadcasted report scheme configuration message may be delivered to the terminals in the order of the first terminal 501, the second terminal 502, . . . , and the n-th terminal 50n.

However, the learning report message for the artificial neural network for CSI feedback, which is reported by each of the terminals 501, 502, . . . , and 50n, may not be transmitted based on the distance between the base station and each terminal. The transmission time of the learning report message for the artificial neural network for CSI feedback may be determined based on various factors such as the learning time in each of the terminals 501, 502, . . . , and 50n, the reporting time configured in the corresponding terminal based on the report scheme configuration message, a time at which the terminal grants uplink transmission, and/or the like. In addition, the learning time of the online learning of the artificial neural network for CSI feedback for each terminal may be determined based on a computation capability and/or memory capacity of each terminal.

In FIG. 5, a case in which the base station 510 receives the learning report messages for the artificial neural network for CSI feedback from the terminals in the order of the second terminal 502, the first terminal 501, . . . , and the n-th terminal 50n.

As described above, each of the terminals 501, 502, . . . , and 50n may transmit information learned by itself to the base station 510 using the report message at the time configured based on the report scheme configuration message. The learned information of each of the terminals 501, 502, . . . , and 50n may include information on the entire model (or model parameters) at the time of configuring the report message, or may include information difference values between the configured model (before learning) and the model after learning.

As in the step S530, the base station 510 may receive the report message including the result of online learning of the artificial neural network from each of the terminals 501, 502, . . . , and 50n using the artificial neural network for CSI feedback. In this case, the base station 510 may use only the learned information of each terminal received at the set (maximum) temporal interval as valid information. For example, a report message received from a specific terminal before the maximum temporal interval may be regarded as invalid. To this end, the base station 9510 may set all of the memory (not illustrated in FIG. 5) for receiving and storing the report messages to initial values when the (maximum) temporal interval starts. That is, when a period of the (maximum) temporal interval illustrated in FIG. 5 is $T_k$ and a period of the (maximum) temporal interval including the step S520 is $T_{k-1}$ (not illustrated in FIG. 5), the base station 510 may consider the report message received in the period $T_k$ as valid, and determine that the report message received in the period $T_{k-1}$ is invalid.

In the description of the exemplary embodiments above, the artificial neural network for CSI feedback has been described as an example. However, the present disclosure is not limited thereto, and may be applied to artificial neural networks for other purposes as well as beam management and positioning accuracy enhancement. In addition, the sixth exemplary embodiment described above also may be applied together with other exemplary embodiments to be described below as well as the exemplary embodiments described above within a range that they do not conflict with each other.

Seventh Exemplary Embodiment

In a seventh exemplary embodiment of the present disclosure, when an artificial neural network for wireless communication is applied in a mobile communication system composed of a base station and one or more terminals, in particular, when a terminal reports capability information related to the artificial neural network to the base station, one or more of the following information may be included in the report.

(1) Artificial neural network performance capability
 A. Floating point operations per second (FLOPS)
 B. Number of storable parameters (memory size)
(2) Artificial neural network learning ability
 A. Number of operations per unit time (FLOPS)
 B. Number of storable parameters (memory)

Here, performing of an artificial neural network may refer to an operation of performing inference using the artificial neural network.

In an exemplary embodiment of the present disclosure, it may be assumed that a terminal supports an artificial neural network for improving wireless communication performance in a mobile communication system composed of a base station and the terminal, such as the 5G NR system according to the 3GPP technical specifications. In this case, the base station may configure various artificial neural networks to the terminal with a high degree of freedom. However, the terminal may have difficulty in inferring by using or performing learning of a complex artificial neural network required by the base station according to an implementation scheme of the terminal. Therefore, in the seventh exemplary embodiment of the present disclosure, the terminal may report artificial neural network performance capability and/or artificial neural network learning capability expressed in terms of the number of operations per unit time (FLOPS) and/or the number of storable parameters (memory size). Accordingly, the base station may configure an artificial neural network based on the capability information reported by the terminal.

The seventh exemplary embodiment described above also may be applied together with the exemplary embodiments described above within a range that they do not conflict with each other.

The seventh exemplary embodiment of the present disclosure described above may also be applied within a range that does not conflict with the previously described embodiments.

In the above description, each exemplary embodiment has been described individually. Hereinafter, a case in which the exemplary embodiments according to the present disclosure are performed in combination will be described as an exemplary embodiment.

FIG. 6 is a sequence diagram for a case of performing artificial neural network learning between a terminal and a base station according to the disclosure.

The case of FIG. 6 will be described based on one terminal 601 and one base station 602. However, it will be apparent to those skilled in the art that a plurality of terminals may belong to the base station 602 and the operation described in FIG. 6 may be applied to other terminals as well.

The base station 602 may request the terminal 601 to report capability information (S610). Here, the capability information may be capability information for artificial neural networks. For example, when information on whether the terminal 601 is capable of using artificial neural networks, supportable artificial neural network sharing (or generation) type(s), supportable artificial neural network online learning type(s), artificial neural network performance capability, artificial neural network learning capability, and/or the like is obtained in advance, the base station 602 may not perform a capability information report request.

For example, the cases when the base station 602 does not perform the capability information report request may correspond to a case when the terminal 601 reports artificial intelligence related capability information to the base station in advance during initial registration to the base station 602. As described, when the terminal 601 reports capability information related to artificial intelligence in the initial registration step with the base station 602, the step S610 may not be performed.

As another example, when the terminal 601 moves through handover while communicating with another base station, capability information related to artificial intelligence of the terminal 601 may be delivered from the another base station. In the above-described manner, when information on a terminal handed over from another base station is received from the another base station, the capability information report request may not be made.

The terminal 601 may transmit a capability information report message to the base station 602 in response to the capability information report request or by itself. The terminal 601 may report the capability information report message related to the artificial neural network to the base station 602 even when there is no capability information report request. In this case, as described above, the capability information report message related to the artificial neural network may be reported to the base station 602 if necessary in an initial access procedure to the base station 602. Alternatively, when the terminal 601 determines that use of a specific artificial neural network is necessary, the terminal 601 may transmit the capability information report message related to the artificial neural network to the base station 602.

The capability information report message related to the artificial neural network may include the information described in the above-described exemplary embodiments. For example, the terminal 601 may include and report at least one of the artificial neural network sharing (or generation) types in the capability information report message. The terminal 601 may include and report at least one of the artificial neural network learning types in the capability information report message. The terminal 601 may aggregate and report information in which artificial neural network sharing (or generation) types and artificial neural network learning types corresponding thereto are combined (e.g., the information illustrated in <Table 1>) as one information in the capability information report message. The terminal 601 may include and report the artificial neural network performance capability and/or the artificial neural network learning capability in the capability information report message.

The base station 602 may receive the capability information report message from the terminal 601 (S612), and generate artificial neural network (ANN) configuration information based on the capability information report message received (S614).

The ANN configuration information may include at least one of the following information. For example, the ANN configuration information may include information on a sharing (or generation) type of an ANN and a learning type of the ANN. As another method, as exemplified in <Table 1>, the ANN configuration may include one information indicating a specific ANN sharing type and a specific ANN learning type based on the mapping information between ANN sharing (or generation) types and ANN learning types. In addition, the ANN configuration information may include information on the (maximum) temporal interval or aggregation times described in the sixth exemplary embodiment.

The base station 602 may transmit the ANN configuration information generated in the step S614 to the terminal 601. The ANN configuration information may be transmitted to a terminal, terminals belonging to a terminal group, or terminals in the entire cell according to the sharing (or generation) type of the ANN. When transmitted to the terminals of the entire cell, it may be individually transmitted to each terminal. In addition, if a broadcast message capable of broadcasting information related to artificial neural networks is defined in the communication system, it may be transmitted using the defined broadcast message.

Upon receiving the ANN configuration information, the terminal 601 may store the ANN configuration information in an internal memory (S616).

The terminal 601 may train the ANN based on the received ANN configuration information (S618). Also, the terminal 601 may update the ANN included in the terminal 601 based on a learning result of the ANN or store information to be updated in the internal memory.

In addition, the terminal 601 may generate an online learning information report message. The online learning information report message may be generated by including information on the entire model updated through online learning (the updated model itself) or information a difference between the ANN model before the update and the ANN model after the update. Here, the difference between the ANN models may be the change amounts of the weight vectors described above.

The terminal 601 may transmit the online learning information report message to the base station 602 (S620). In this case, a time at which the online learning information report message is transmitted may be a reporting time or a reporting period configured to the terminal based on the (maximum) temporal interval or aggregation time which is included in the ANN configuration information received in the step S616.

Since the configuration of the online learning information report message that the terminal 601 reports to the base station 602 has been described above, redundant description will be omitted.

The base station 602 may aggregate the online learning information report message received in the step S620 (S622). FIG. 6 illustrates a form in which one terminal reports to the base station 602. However, as illustrated in FIG. 5 above, the report messages may be received from a plurality of terminals. Accordingly, the base station 602 may aggregate the online learning information report messages received from the respective terminals.

In addition, in the step S622, the base station 602 may determine a weight vector update direction for the terminals. The base station 602 may determine the weight vector update direction when federated learning of the terminals is performed. In the present disclosure, since how to determine the weight vector update direction is out of the subject of the present disclosure, a detailed description thereof will be omitted.

After determining the weight vector update direction, the base station 602 may generate weight vector update information based thereon. When the terminals perform federated learning and the base station 602 generates the weight update information in the step S622, the base station 602 may transmit the weight vector update information to the respective terminal (S624).

Meanwhile, FIG. 6 described above is an example that is implementable using the first to seventh exemplary embodiments. Therefore, all the features of the present disclosure are not limited to the one example described in FIG. 6, and some of them may not be performed. Alternatively, the features that have be described in each exemplary embodiment, but not mentioned in the description of FIG. 6 may be additionally performed.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of a base station, comprising:
   receiving, from each of terminals belonging to the base station, a capability information report message related to an artificial neural network;
   generating artificial neural network configuration information based on capability of the base station and the capability information report message received from each of the terminals;
   transmitting the generated artificial neural network configuration information to the terminals belonging to the base station; and
   receiving an online learning information report message from the terminals based on the artificial neural network configuration information,
   wherein the artificial neural network configuration information includes information indicating a type in which the artificial neural network is shared in units of a cell, a type in which the artificial neural network is shared in units of a terminal group, a type in which the artificial neural network is shared in units of a terminal, or a type in which the artificial neural network is shared in units of a cell group, and
   wherein the online learning information report message includes an entire model of the artificial neural network after the online learning or a difference between the artificial neural network before the online learning and the artificial neural network after the online learning.

2. The method according to claim 1, wherein the capability information report message related to the artificial neural network includes information indicating one of the type in which the artificial neural network is shared in units of a cell, the type in which the artificial neural network is shared in units of a terminal group, the type in which the artificial neural network is shared in units of a terminal, or the type in which the artificial neural network is shared in units of a cell group, which each of the terminals supports.

3. The method according to claim 1, wherein when the artificial neural network configuration information indicates the type in which the artificial neural network is shared in units of a terminal group, the terminal group includes terminals having a same identification indicator.

4. The method according to claim 1, wherein when the artificial neural network configuration information indicates the type in which the artificial neural network is shared in units of a cell group, the cell group includes cells having a same identification indicator.

5. The method according to claim 1, wherein the artificial neural network configuration information further includes information indicating one of a type that does not support online learning, a type in which only the terminals support online learning, a type in which only the base station supports online learning, or a type in which both the base station and the terminals support online learning.

6. The method according to claim 5, wherein the artificial neural network configuration information further includes at least one of information on a temporal interval configured for each of the terminals to report information learned through the online learning or information on times for aggregating the information learned through the online learning from each of the terminals.

7. The method according to claim 1, further comprising:
determining an update of a weight vector of the artificial neural network shared with the terminals based on the received online learning information report message; and
transmitting weight update information to the terminals based on the determination to update the weight vector of the artificial neural network.

8. A method of a terminal, comprising:
receiving, from a base station of a cell to which the terminal belongs, a capability information report request message for an artificial neural network;
transmitting a capability information report message related to the artificial neural network to the base station in response to reception of the capability information report request message;
receiving artificial neural network configuration information from the base station; and
configuring an artificial neural network in the terminal based on the received artificial neural network configuration information;
performing online learning of the artificial neural network configured in the terminal;
generating an online learning information report message based on the online learning; and
transmitting the online learning information report message to the base station based the information on the temporal interval configured to report the information learned through the online learning or information on times for aggregating the information learned through the online learning,
wherein the artificial neural network configuration information includes information indicating a type in which the artificial neural network is shared in units of a cell, a type in which the artificial neural network is shared in units of a terminal group, a type in which the artificial neural network is shared in units of a terminal, or a type in which the artificial neural network is shared in units of a cell group.

9. The method according to claim 8, wherein the capability information report message related to the artificial neural network includes information indicating one of the type in which the artificial neural network is shared in units of a cell, the type in which the artificial neural network is shared in units of a terminal group, the type in which the artificial neural network is shared in units of a terminal, or the type in which the artificial neural network is shared in units of a cell group, which each of the terminals supports.

10. The method according to claim 8, wherein the artificial neural network configuration information further includes information indicating one of a type that does not support online learning, a type in which only the terminals support online learning, a type in which only the base station supports online learning, or a type in which both the base station and the terminals support online learning.

11. The method according to claim 8, wherein the artificial neural network configuration information further includes at least one of information on a temporal interval configured for each of the terminals to report information learned through the online learning or information on times for aggregating the information learned through the online learning from each of the terminals.

12. A base station comprising a processor, wherein the processor causes the base station perform:
receiving, from each of terminals belonging to the base station, a capability information report message related to an artificial neural network;
generating artificial neural network configuration information based on capability of the base station and the capability information report message received from each of the terminals;
transmitting the generated artificial neural network configuration information to the terminals belonging to the base station; and
receiving an online learning information report message from the terminals based on the artificial neural network configuration information,
wherein the artificial neural network configuration information includes information indicating a type in which the artificial neural network is shared in units of a cell, a type in which the artificial neural network is shared in units of a terminal group, a type in which the artificial neural network is shared in units of a terminal, or a type in which the artificial neural network is shared in units of a cell group, and
wherein the online learning information report message includes an entire model of the artificial neural network after the online learning or a difference between the artificial neural network before the online learning and the artificial neural network after the online learning.

13. The base station according to claim 12, wherein the capability information report message related to the artificial neural network includes information indicating one of the type in which the artificial neural network is shared in units of a cell, the type in which the artificial neural network is shared in units of a terminal group, the type in which the artificial neural network is shared in units of a terminal, or the type in which the artificial neural network is shared in units of a cell group, which each of the terminals supports.

14. The base station according to claim 12, wherein when the artificial neural network configuration information indicates the type in which the artificial neural network is shared in units of a terminal group, the terminal group includes terminals having a same identification indicator, and when the artificial neural network configuration information indicates the type in which the artificial neural network is shared in units of a cell group, the cell group includes cells having a same identification indicator.

15. The base station according to claim 12, wherein the artificial neural network configuration information further includes information indicating one of a type that does not support online learning, a type in which only the terminals support online learning, a type in which only the base station supports online learning, or a type in which both the base station and the terminals support online learning.

16. The base station according to claim 15, wherein the artificial neural network configuration information further includes at least one of information on a temporal interval configured for each of the terminals to report information learned through the online learning or information on times for aggregating the information learned through the online learning from each of the terminals.

17. The base station according to claim 12, wherein the processor further causes the base station to perform:
- determining an update of a weight vector of the artificial neural network shared with the terminals based on the received online learning information report message; and
- transmitting weight update information to the terminals based on the determination to update the weight vector of the artificial neural network.

* * * * *